United States Patent
Datta et al.

(10) Patent No.: US 9,403,956 B2
(45) Date of Patent: Aug. 2, 2016

(54) INCIPIENT WETNESS METHOD TO ENHANCE PRODUCTIVITY OF SUPPORTED ZIEGLER-NATTA CATALYSTS

(71) Applicant: ExxonMobil Chemical Patents Inc., Baytown, TX (US)

(72) Inventors: Sudhin Datta, Houston, TX (US); Mosha H. Zhao, Houston, TX (US); Elizabeth A. Legg, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/159,231

(22) Filed: Jan. 20, 2014

(65) Prior Publication Data

US 2014/0221515 A1    Aug. 7, 2014

Related U.S. Application Data

(60) Provisional application No. 61/761,370, filed on Feb. 6, 2013.

(51) Int. Cl.
| | | |
|---|---|---|
| *C08J 9/00* | (2006.01) | |
| *C08F 2/00* | (2006.01) | |
| *C08L 23/12* | (2006.01) | |
| *C08F 10/06* | (2006.01) | |

(52) U.S. Cl.
CPC ............... *C08J 9/0061* (2013.01); *C08F 2/001* (2013.01); *C08F 10/06* (2013.01); *C08L 23/12* (2013.01)

(58) Field of Classification Search
CPC ......... C08J 9/0061; C08J 9/00; C98F 210/02; C08F 2/00; C08F 210/06

USPC .................................................. 525/193, 240
See application file for complete search history.

(56) References Cited

U.S. PATENT DOCUMENTS

| | | | |
|---|---|---|---|
| 4,407,989 A | | 10/1983 | Takao et al. |
| 5,079,302 A | * | 1/1992 | Lee et al. ............... 525/256 |
| 5,416,169 A | * | 5/1995 | Saito et al. ............. 525/387 |
| 2006/0052541 A1 | | 3/2006 | Hagen et al. |
| 2006/0293461 A1 | | 12/2006 | Jiang et al. |
| 2007/0225455 A1 | * | 9/2007 | Jiang et al. ............... 526/65 |
| 2011/0306731 A1 | | 12/2011 | Chou |

FOREIGN PATENT DOCUMENTS

| | | |
|---|---|---|
| WO | 00/53646 | 9/2000 |
| WO | WO2012/034956 | 3/2012 |

OTHER PUBLICATIONS

Idoia Urdampilleta et al., Macromolecules, *Morphology of High Impact Polypropylene Particles*, vol. 38, pp. 2795-2801, 2005.

Jon A. Debling et al., Journal of Applied Polymer Science, *Morphological Development of Impact Polypropylene Produced in Gas Phase with a TiCl4/MgCl2 Catalyst*, vol. 81, pp. 3085-3106, 2001.

* cited by examiner

*Primary Examiner* — Nathan M Nutter

(57) ABSTRACT

Processes for producing impact copolymers are provided. Ethylene and at least one comonomer can be polymerized in the presence of one or more catalysts, polypropylene particles, and an inert solvent to produce an impact copolymer. The polypropylene particles can have a weight average particle size along the longest cross-sectional length thereof of about 0.05 mm to about 5 mm and a pore volume of less than 80%. The inert solvent can be present in a volume amount of about 0.1 to about 2 times the pore volume of the polypropylene particles.

36 Claims, 2 Drawing Sheets

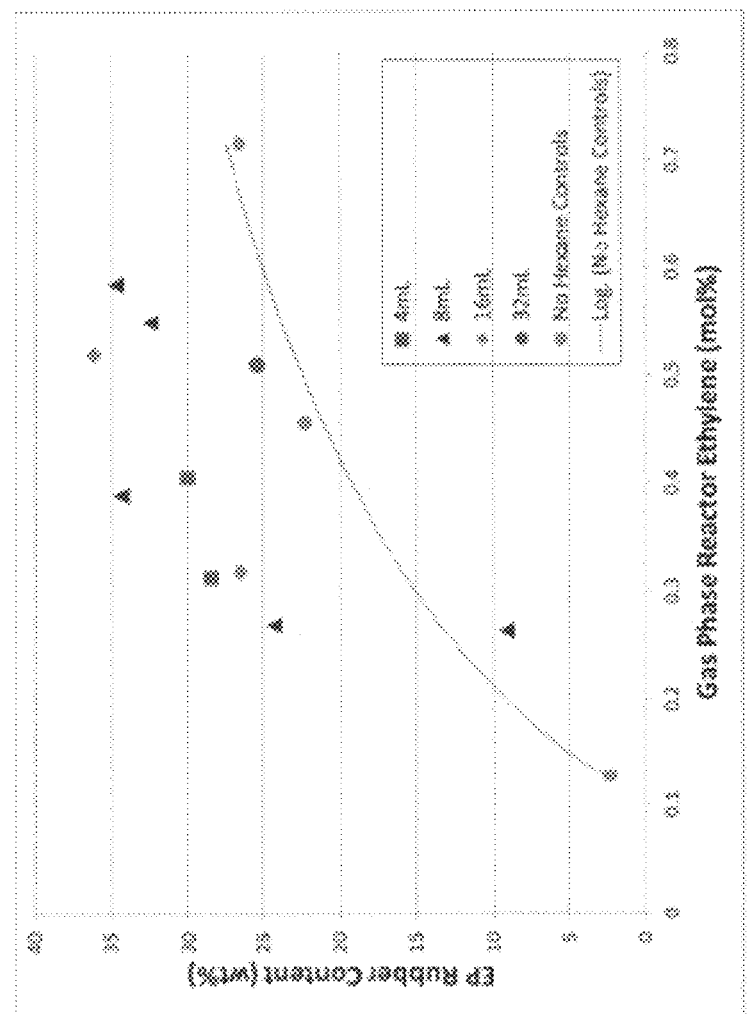

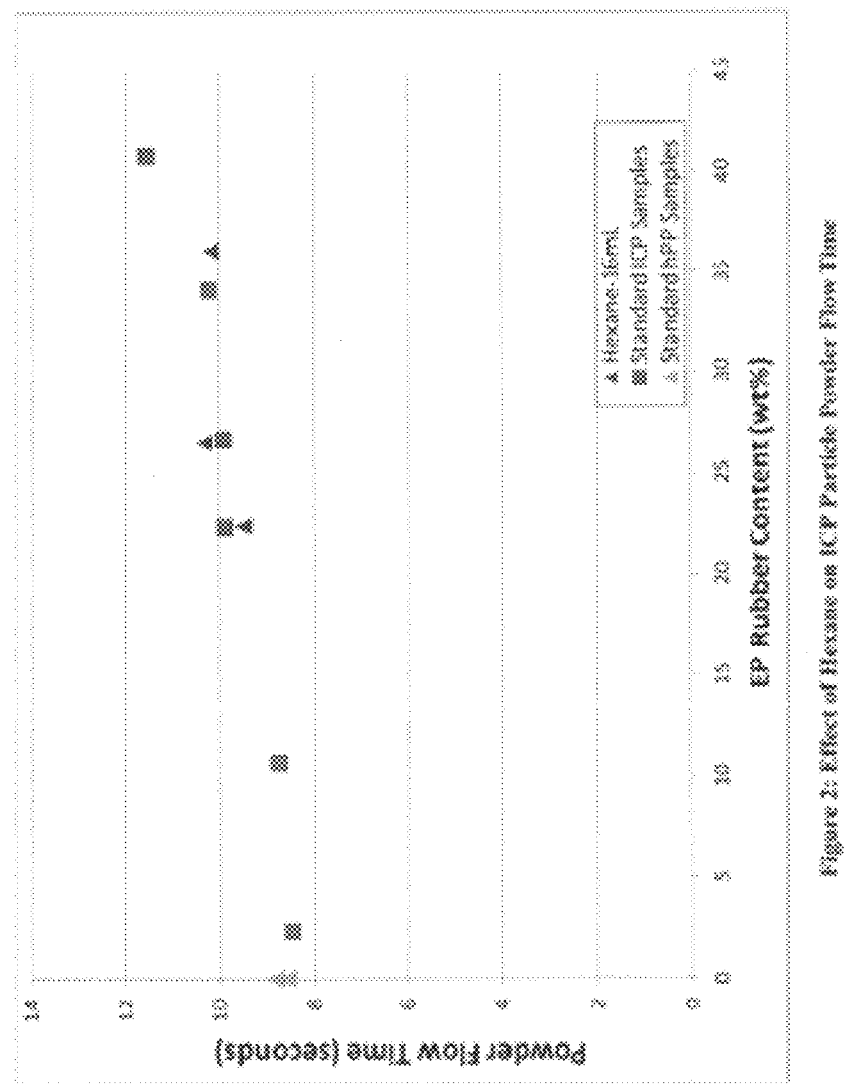

INCIPIENT WETNESS METHOD TO ENHANCE PRODUCTIVITY OF SUPPORTED ZIEGLER-NATTA CATALYSTS

PRIORITY CLAIM

This application claims priority to and the benefit of U.S. Provisional Application No. 61/761,370, filed Feb. 6, 2013.

FIELD

Embodiments provided herein generally relate to processes for making impact copolymers. More particularly, embodiments provided herein relate to processes for making impact copolymers using two or more polymerization stages.

BACKGROUND

Impact copolymers (ICP's) are commonly used in a variety of applications where 10 strength and impact resistance are desired, such as molded and extruded automobile parts, household appliances, luggage, and furniture. Propylene based ICP's are typically an intimate mixture of a continuous phase of a crystalline polypropylene polymer and a dispersed rubbery phase of a secondary polymer, e.g., an ethylene copolymer. While these so-called ICP products have been produced by melt compounding the individual polymer components, 15 multi-reactor technology makes it possible to produce them directly. This is accomplished by polymerizing propylene in a first reactor and transferring the polypropylene polymer from the first reactor into a second reactor where the secondary copolymer is produced in the presence of the polypropylene polymer.

A variety of polymerization processes can be used to prepare the crystalline 20 polypropylene polymer and the secondary polymer, such as gas phase, slurry, liquid, and/or solution polymerization. It is also quite common to make the constituent polymers in two different polymerization processes, for example, slurry phase for the polymerization of the polypropylene polymer and gas phase for the polymerization of the ethylene copolymer.

One problem encountered in a two stage or two step polymerization process that uses gas phase polymerization for the secondary ethylene copolymer is that the molecular weight of the polymer is lower than desired. Another problem is that the amount of the secondary ethylene copolymer produced with respect to the crystalline polypropylene polymer is lower than desired.

There is a need, therefore, for improved polymerization processes for making ICP's having an increased amount of the secondary ethylene copolymer relative to the crystalline polypropylene polymer and an increased molecular weight of the secondary ethylene copolymer.

SUMMARY

Processes for producing impact copolymers are provided. In at least one specific embodiment, the process can include polymerizing ethylene and at least one comonomer in the presence of one or more catalysts, polypropylene particles, and an inert solvent to produce an impact copolymer. The impact copolymer 5 can include the polypropylene particles and an ethylene copolymer. The polypropylene particles can have a weight average particle size along the longest cross-sectional length thereof of about 0.05 mm to about 5 mm and a pore volume of less than 80%. The inert solvent can be present in a volume amount of about 0.1 to about 2 times the pore volume of the polypropylene particles.

In at least one specific embodiment, the process for making the impact copolymer can include mixing polypropylene particles having a weight average particle size along the longest cross-sectional length thereof of from about 0.05 mm to about 5 mm and a pore volume of less than 80% with one or more inert solvents to provide inert solvent containing polypropylene particles. At least a portion of the one or more inert solvents can be located within the pore volume of the polypropylene particles. The process can also include polymerizing ethylene and at least one comonomer in the presence of a catalyst and the inert solvent containing polypropylene particles to produce an impact copolymer.

In at least one specific embodiment, the process for making the impact copolymer can include combining ethylene and at least one comonomer with a Ziegler-Natta catalyst or a single site catalyst in a polymerization reactor at conditions sufficient to produce polypropylene particles having a weight average particle size along the longest cross-sectional length thereof of about 0.05 mm to about 5 mm and a pore volume of less than 80%. The process can also include combining the polypropylene particles with an inert solvent to produce inert solvent-containing polypropylene particles having at least a portion of the inert solvent located within the pores of the polypropylene particles. Ethylene and at least one comonomer can be combined with the inert solvent-containing polypropylene particles and the catalyst. At least a portion of the ethylene and at least a portion of the comonomer can be located within the pores of the polypropylene particles. The ethylene and the comonomer can be polymerized within the pores of the polypropylene particles to produce an impact copolymer.

BRIEF DESCRIPTION OF THE DRAWINGS

FIG. 1 shows the effect hexane has on the ethylene-propylene content (wt %) during the production of impact copolymers by gas-phase polymerization.

FIG. 2 shows the effect hexane has on the flow time (seconds) of impact copolymer particles, measured according to ASTM D 1895-96.

DETAILED DESCRIPTION

The impact copolymer can include one or more polypropylene polymers and one or more ethylene copolymers. The polypropylene polymer and the ethylene copolymer can be made using any one or more polymerization processes capable of polymerizing their respective monomer components. As used herein, the terms "ethylene copolymer," "elastomeric polymer," "ethylene rubber," "elastomer," and "rubber" are used interchangeably and refer to the ethylene copolymer component of the impact copolymer.

Illustrative polymerization processes can include, but are not limited to, gas phase, solution, slurry, high-pressure, or combinations thereof. In at least one example, the polypropylene polymer can be produced via a solution or slurry polymerization process and the ethylene copolymer can be produced via a gas-phase polymerization process. More preferably, the impact copolymer can be made using slurry polymerization to produce the polypropylene polymer followed by gas-phase polymerization of ethylene and one or more comonomers in the presence of the polypropylene polymer particles to produce the ethylene copolymer to form the impact copolymer.

As discussed and described in more detail below, the in-situ polymerization of the impact copolymer can employ any appropriate polymerization catalyst or combination of catalysts capable of polymerizing the monomer component(s) of the polypropylene component and the ethylene copolymer component. For example, the catalyst can be or include one or more Ziegler-Natta and/or one or more single-site (e.g., metallocene) polymerization catalysts. The catalyst(s) can be supported, e.g., for use in heterogeneous catalysis processes, or unsupported, e.g., for use in homogeneous catalysis processes. Preferably, the polypropylene polymer and the ethylene copolymer can be made with a common supported Ziegler-Natta or single-site catalyst.

The polymerization of propylene and, if present, any other monomer(s) to produce the polypropylene polymer can form polypropylene particles having a weight average particle size along the longest cross-sectional length thereof from a low of about 0.01 mm, about 0.05 mm, about 0.1 mm, about 0.3 mm, or about 0.5 mm to a high of about 2 mm, about 3 mm, about 4 mm, about 5 mm, or about 6 mm. For example, the polypropylene particles can have a weight average particle size along the longest cross-sectional length thereof of from about 0.05 mm to about 5 mm, about 0.1 mm to about 4 mm, about 1 mm to about 4.5 mm, about 1.5 mm to about 3 mm, about 2 mm to about 4 mm, or about 0.2 mm to about 3.5 mm.

The polypropylene particles can also have one or more pores at least partially formed therein and/or there through. The polypropylene particles can have a pore volume of less than 80%, less than 75%, less than 70%, less than 60%, less than 50%, or less than 40%. For example, the polypropylene particles can have a pore volume from a low of about 5%, about 10%, about 15%, or about 20% to a high of about 55%, about 65%, about 75%, about 80%, about 85%, or about 90%. Preferably, the polypropylene particles have a pore volume of less than 80%.

The pores formed in and/or through the polypropylene particles can have an average volume from a low of about $10^{-9}$ mm$^3$, about $10^{-8}$ mm$^3$, about $10^{-7}$ mm$^3$, or about $10^{-5}$ mm$^3$, to a high of about 10 mm$^{-3}$, about $10^{-2}$ mm$^3$, about $10^{-1}$ mm$^3$, about 1 mm$^3$, or about 10 mm$^3$. For example, the polypropylene particles can have pores having an average volume of about $10^{-9}$ mm$^3$ to about 10 mm$^{-3}$, about $10^{-7}$ mm$^3$ to about $10^{-2}$ mm$^3$, or about $10^{-5}$ mm$^3$ to about $10^{-4}$ mm$^3$.

The pores formed in and/or through the polypropylene particles can have a cross sectional length or in the case of spherical pores a diameter of from a low of about $10^{-6}$ mm, about $10^{-5}$ mm, about $10^{-4}$ mm, or about $10^{-3}$ mm to a high of about $10^{-3}$ mm, about $10^{-2}$ mm, about $10^{-1}$ mm, about 1 mm, or about 10 mm.

Without wishing to be bound by theory, it is believed that the catalyst resides, occupies or at least partially resides or occupies within the pores or along the inner walls of the pores that are at least partially formed in or through the polypropylene particles. Accordingly, it is believed that the polymerization of the ethylene and the at least one comonomer, or at least a majority of the polymerization of the ethylene and the at least one comonomer, occurs within the pores of the polypropylene particles as opposed to outside or external to the polypropylene particles. Thus, the resulting impact copolymer can be in the form of polymer particles having a continuous phase composed of the polypropylene particles with a disperse, discontinuous, or occluded phase made up of the ethylene copolymer. Said another way, the ethylene copolymer component can at least partially occupy one or more of the pores that were present in the polypropylene polymer particles prior to polymerization of the ethylene and the comonomer therein.

It has been surprisingly and unexpectedly discovered that mixing, blending, combining, or otherwise contacting the polypropylene particles with one or more inert solvents to produce solvent-containing polypropylene particles can lead to a significant increase in the molecular weight, e.g., the weight average molecular weight "Mw," of the ethylene copolymer component. It has also been surprisingly and unexpectedly discovered that contacting the polypropylene particles with one or more inert solvents to produce the solvent-containing polypropylene particles can lead to a significant increase in the amount or concentration, e.g., weight percent, of the ethylene copolymer present in the impact copolymer product. Either or both of these increases, i.e., the increase in molecular weight and/or the increase in concentration of the ethylene copolymer in the impact copolymer product, can produce impact copolymers having improved properties including increased impact strength.

The inert solvent can be any compound or mixture of two of more compounds that do not chemically incorporate into the polypropylene particles, the copolymer, or the impact copolymer at polymerization conditions. The inert solvent is a separate and distinct compound or combination of compounds independent and separate apart from the ethylene and the one or more comonomers polymerized with one another to produce the ethylene copolymer. Said another way, the inert solvent is non-reactive with the monomers polymerized to make the impact copolymer, i.e., the polypropylene polymer and the ethylene copolymer.

Without wishing to be bound by theory, it is believed that the presence of the inert solvent in the solvent-containing polypropylene particles creates, induces, promotes, forms, or otherwise causes an increased presence or concentration of the ethylene and/or the comonomer within the pores of the polypropylene particles. For example, the ethylene and/or the comonomer can be miscible with, dissolvable in, mixable with, or otherwise combinable with the inert solvent, and the ethylene and/or comonomer combined with the inert solvent can be present within the pores of the polypropylene particles in an greater amount when the inert solvent is present compared to when the inert solvent is not. The inert solvent can be said to act as a miscibility agent or miscibility compound that can increase the concentration of the ethylene and/or comonomer(s) within the pores of the polypropylene particles.

Since the catalyst is believed to be located within, on, or about the inner surfaces of the pores formed within and/or through the polypropylene particles, the increased concentration of ethylene or comonomer therein can increase the molecular weight and/or concentration of the ethylene copolymer. More particularly, in gas phase polymerization it is believed that the inert solvent is drawn into the pores of the polypropylene particles, thus contacting the catalyst therein. It is also believed that the concentrations of the ethylene and the comonomers in the solvent within the pores will be higher than the concentrations of the ethylene and the comonomers in the gas phase, as dictated by Raoult's law. Said another way, the presence of the inert solvent causes more of the ethylene and/or comonomer to flow into the pores of the catalyst because of the ability of the inert solvent to dissolve the ethylene and/or comonomer. Additionally, it is believed that the increase in molecular weight and/or concentration of the ethylene copolymer can be further increased by removing at least a portion of the heat generated from the polymerization of the ethylene and the one or more comonomers.

The inert solvent can be mixed, blended, or otherwise contacted with the polypropylene particles and the catalyst disposed therein, thereon, or otherwise about the polypropylene particles at any desired point during the production of the impact copolymer. For example, the inert solvent can be contacted with the polypropylene particles and the solvent-containing polypropylene particles can be introduced to a polymerization reactor configured to also receive the ethylene and the comonomer. In another example, the inert solvent can be introduced to a polymerization reactor configured to also receive the polypropylene particles, the ethylene, and the comonomer and the inert solvent can be contacted with the polypropylene particles within the reactor. In another example, the inert solvent can be mixed, blended, or otherwise contacted with the ethylene and/or the comonomer and introduced as a mixture to a reactor configured to also receive the polypropylene particles. In still another example, the polypropylene particles can be produced in the presence of the inert solvent, thus forming solvent-containing polypropylene particle via the polymerization of the polypropylene and, if present, any comonomers.

Preferably, the selection of the inert solvent can include one or more compounds capable of being disengaged from the impact copolymer product via standard separation processes, e.g., flash separation. The inert solvent can have a boiling point at atmospheric pressure greater than 0° C., greater than 20° C., greater than 40° C., or greater than 60° C. and less than 90° C., less than 110° C., less than 130° C., less than 140° C., or less than 150° C. For example, the inert solvent can have a boiling point at atmospheric pressure of about 65° C. to about 115° C., about 68° C. to about 81° C., about 105° C. to about 115° C., about 60° C. to about 130° C., or about 55° C. to about 135° C.

The inert solvent, when in the polymerization reactor, can be a gas or liquid within the reactor. The inert solvent, when in the polymerization reactor and disposed within the pores of the polypropylene particles, can be in a gas and/or liquid phase. Preferably, at least a portion of the inert solvent located within the pores of the polypropylene particles can be in the liquid phase. For example, at least 10%, at least 30%, at least 50%, or at least 70% of the inert solvent within the pores of the polypropylene particles, when the polypropylene particles are located within the polymerization reactor, can be in the liquid phase rather than the gas phase. In contrast, at least 90%, at least 70%, at least 50%, or at least 30% of the inert solvent within the reactor, but external to the polypropylene particles, can be in the gas phase rather than the liquid phase. The polymerization reactor conditions, e.g., temperature and/or pressure, selection of inert solvent, pore size of the polypropylene particles, ethylene and/or comonomer concentration, as well as other factors can be used, alone or in combination with one another, to control, modify, adjust, or otherwise alter the amount of the inert solvent that is in the gas phase versus the liquid phase.

Suitable inert solvents can contain from about 2 carbon atoms to about 20 carbon atoms. For example, the inert solvent can have 3, 4, 5, 6, 7, 8, 9, 10, 11, 12, 13, 14 or 15, carbon atoms. The inert solvent can include alkanes, cycloalkanes, aromatics, cycloalkenes, or any combination thereof. Illustrative alkanes can include, but are not limited to, pentane, hexane, heptane, octane, nonane, decane, isomers thereof, e.g., neopentane, and/or any mixture thereof. Illustrative cycloalkanes can include, but are not limited to, cyclopentane, cyclohexane, cycloheptane, cyclooctane, cyclononane, cyclodecane, or any mixture thereof. Illustrative aromatics can include, but are not limited to, toluene, naphthalene, xylene and biphenyl, or any mixture thereof. Illustrative cycloalkenes can include, but are not limited to, cyclohexane, cyclopentane, methyl cyclohexane, or any mixture thereof. Suitable inert solvents can also include materials containing silicon, boron, and/or aluminum which have the same or similar solubility and boiling characteristics as the aforementioned carbon containing compounds. Suitable inert solvents that include silicon, boron, and/or aluminum can include, but are not limited to, tetramethyl silane, tetraethyl silane, triethyl borane, or any mixture thereof.

In one or more embodiments, the miscibility or dissolvability of the one or more comonomers in the inert solvent can be greater than the miscibility or dissolvability of ethylene in the inert solvent. In such a scenario, it is believed that the increased concentration of the comonomer, e.g., propylene, can further increase the molecular weight and/or concentration of the ethylene copolymer in the impact copolymer due to the increased molecular weight of the comonomer relative to ethylene. The inert solvent can be capable of dissolving abut $10^{-2}$ g ethylene per gram inert solvent to about 10 g ethylene per gram inert solvent at a pressure from about 3 psi to about 300 psi absolute and a temperature from about 20° C. to about 130° C. The inert solvent can be capable of dissolving about $10^{-2}$ g propylene per gram inert solvent to about 20 g propylene per gram inert solvent at a pressure from about 3 psi to about 300 psi absolute and a temperature from about 20° C. to about 130° C.

The amount of the inert solvent combined with the polypropylene particles can be from a low of about 0.1, about 0.2, about 0.3, about 0.4, about 0.5, about 0.6, about 0.7, or about 0.8 to a high of about 1.2, about 1.3, about 1.4, about 1.5, about 1.6, about 1.7, about 1.8, about 1.9, or about 2 times the pore volume of the polypropylene particles. In at least one embodiment, the inert solvent can be present in an amount of less than 1.5 times, less than 1.4 times, less than 1.3 times, less than 1.2 times, less than 1.1 times, less than 1 times, less than 0.9 times, less than 0.8 times, less than 0.7 times, or less than 0.6 times the pore volume of the polypropylene particles. In at least one other embodiment the inert solvent can be combined with the polypropylene particles in an amount greater than about 0.5 times, or greater than about 0.65 times, or greater than about 0.75 times to less than 1.4 times, less than 1.25 times, or less than 1.15 times the pore volume of the polypropylene particles.

Polypropylene Polymers

As used herein, "polypropylene polymer" can include homopolymers of propylene derived units and/or copolymers of propylene derived units comprising within the range from about 0.1 wt % to about 1 wt %, about 3 wt %, or about 5 wt % of a copolymer of ethylene or C4 to C12 α-olefin derived units, ethylene derived units in a particular embodiment. As such, the polypropylene polymer can be selected from polypropylene homopolymer, polypropylene copolymers, blends thereof, or any combination thereof. The homopolymer can be atactic polypropylene, isotactic polypropylene, highly isotactic polypropylene, syndiotactic polypropylene, and blends thereof. The polypropylene copolymer can be a polypropylene homopolymer (HPP), a random copolymer (RCP), a statistical copolymer, a block copolymer, and blends thereof.

The polypropylene polymer can have a propylene content of at least 85 wt %, preferably at least 90 wt %, preferably at least 95 wt %, preferably at least 97 wt %, or preferably 100 wt %. For example, the polypropylene polymer can have a propylene content from about 85 wt % to about 99 wt %, about 88 wt % to about 98 wt %, about 87 wt % to about 96 wt %, about 91 wt % to about 98 wt %, or about 86 wt % to about 99 wt %. In at least one embodiment, the polypropylene polymer can be a homopolymer.

The polypropylene polymer can have a weight average molecular weight (Mw) from a low of about 25 kg/mol, about 50 kg/mol, about 100 kg/mol, about 200 kg/mol, or about 500 kg/mol to a high of about 700 kg/mol, about 900 kg/mol, about 1,200 kg/mol, about 1,600 kg/mol, or about 2,000 kg/mol. For example, the polypropylene polymer can have a Mw from about 30 kg/mol to about 2,000 kg/mol, about 50 kg/mol to about 1,000 kg/mol, or about 90 kg/mol to about 500 kg/mol.

The polypropylene polymer can have a ratio of the weight average molecular weight (Mw) to number average molecular weight (Mn) or (Mw/Mn) from a low of about 1, about 1.5, or about 2 to a high of about 20, about 30, or about 40. For example, the polypropylene polymer can have a Mw/Mn of about 1.4 to 20, or about 1.6 to 10, or about 1.8 to 3.5, or about 1.8 to 2.5.

The polypropylene polymer can have a branching index (g') from a low of about 0.2, about 0.5, or about 1 to a high of about 1.3, about 1.5, about 1.7, or about 2. For example, the polypropylene polymer can have a branching index of about 0.2 to 2.0, or about 0.5 to about 1.5, or about 0.7 to about 1.3, or about 0.9 to about 1.1.

The polypropylene polymer can have a melt flow rate (MFR) from a low of about 1 dg/min, about 15 dg/min, about 30 dg/min, or about 45 dg/min to a high of about 75 dg/min, about 100 dg/min, about 200 dg/min, or about 300 dg/min. For example, the polypropylene polymer can have an MFR of about 1 dg/min to about 300 dg/min, about 5 dg/min to about 150 dg/min, or about 10 dg/min to about 100 dg/min, or about 20 dg/min to about 60 dg/min.

The polypropylene polymer can have a melting point (Tm, peak second melt) of at least 100° C., or at least 110° C., or at least 120° C., or at least 130° C., or at least 140° C., or at least 150° C., or at least 160° C., or at least 165° C. For example, the polypropylene polymer can have a melting point from at least 100° C. to about 175° C., or about 170° C. to about 165° C., or about 160° C. to about 145° C.

The polypropylene polymer can have a crystallization temperature (Tc, peak) of at least 70° C., or at least 90° C., or at least 110° C., or at least 130° C. For example, the polypropylene polymer can have a crystallization temperature from at least 70° C. to about 75° C., or about 80° C. to about 90° C., or about 110° C. to about 130° C., or about 120° C. to about 150° C.

The polypropylene polymer can have a heat of fusion ($H_f$) from a low of about 40 J/g, about 45 J/g, about 55 J/g, or about 65 J/g to a high of about 90 J/g, about 110 J/g, about 140 J/g, or about 170 J/g. For example, the polypropylene polymer can have a heat of fusion from about 40 J/g to about 160 J/g, or about 50 J/g to about 140 J/g, or about 60 J/g to about 120 J/g, or about 80 J/g to about 100 J/g.

The polypropylene polymer can have a crystallinity from a low of about 5%, about 12%, about 22%, about 33%, or about 44% to a high of about 60%, about 68%, about 78%, or about 83%. For example, the polypropylene polymer can have a crystallinity of about 5% to 80%, about 10% to about 75%, about 20% to about 70%, about 30% to about 65%, or about 40% to about 60%.

The polypropylene polymer can have a heat deflection temperature (HDT) from a low of about 45° C., about 50° C., about 55° C., or about 65° C. to a high of about 100° C., about 115° C., about 130° C., or about 140° C., as measured according to ASTM D 648 (0.45 MPa). For example, the polypropylene polymer can have a heat deflection temperature from about 45° C. to about 140° C., about 60° C. to about 135° C., or about 75° C. to about 125° C., as measured according to ASTM D 648 (0.45 MPa).

The polypropylene polymer can have a Gardner impact strength at 23° C. from a low of about 30 KJ/m$^2$, about 60 KJ/m$^2$, about 100 KJ/m$^2$, or about 150 KJ/m$^2$ to a high of about 500 KJ/m$^2$, about 700 KJ/m$^2$, about 900 KJ/m$^2$, about 1,100 KJ/m$^2$, or about 1,350 KJ/m$^2$, as measured according to ASTM D 5420 (GC). For example, the polypropylene polymer can have a Gardner impact strength at 23° C. of about 30 KJ/m$^2$ to about 1,300 KJ/m$^2$, about 40 KJ/m$^2$ to about 800 KJ/m$^2$, or about 50 KJ/m$^2$ to about 600 KJ/m$^2$, as measured according to ASTM D 5420 (GC).

The polypropylene polymer can have a 1% secant flexural modulus from a low of about 300 MPa, about 500 MPa, about 800 MPa, or about 1,000 MPa to a high of about 1,700 MPa, about 2,100 MPa, about 2,600 MPa, or about 3,100 MPa, as measured according to ASTM D 790 (A, 1.3 mm/min). For example, the polypropylene polymer can have a flexural modulus from about 300 MPa to about 3,000 MPa, about 600 MPa to about 2,500 MPa, about 800 MPa to about 2,000 MPa, or about 1,000 MPa to about 1,500 MPa, as measured according to ASTM D 790 (A, 1.3 mm/min).

The polypropylene polymer can have some level of isotacticity or syndiotacticity. In one embodiment the polypropylene polymer is isotactic polypropylene. In another embodiment the polypropylene polymer is highly isotactic polypropylene. In still another embodiment the polypropylene polymer is a polypropylene homopolymer having at least 85% or at least 90% isotactic pentads. In yet another embodiment the polypropylene polymer is a polypropylene homopolymer having at least 85% or at least 90%) syndiotactic pentads. As used herein, "isotactic" is defined as having at least 10% isotactic pentads according to analysis by $^{13}$C NMR. As used herein, "highly isotactic" is defined as having at least 60% isotactic pentads according to analysis by $^{13}$C NMR.

The polypropylene polymer can have a propylene meso diads of 90% or more, 92% or more, 94% or more, 95% or more, 96% or more, 97% or more, or 98% or more. The isotacticity of the polypropylene polymer can be measured by $^{13}$C NMR. For example, suitable techniques for measuring the isotacticity of the polypropylene polymer can be as discussed and described in U.S. Pat. No. 4,950,720. Expressed another way, the isotacticity of the polypropylene polymer, as measured by $^{13}$C NMR, and expressed as pentad content, is greater than 93% or 95%, or 97% in certain embodiments.

Ethylene Copolymer

"Ethylene copolymers" useful herein are materials that can stretch and recover such that it exhibits an Ultimate Tensile Strength of greater than 2.0 MPa, an Ultimate Elongation of at least 200%, and Tension Set of less than 20% at 100% deformation, as determined by ASTM D 412. Non-limiting examples of such ethylene copolymers include, but are not limited to, EPM (ethylene-propylene rubber), and EPDM rubber (ethylenepropylene-diene rubber) as well as copolymers of ethylene with an alpha olefin or a mixture of alpha olefins. An "alpha olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An ethylene polymer is a polymer typically comprising at least 50 mol % of ethylene; propylene polymer is a polymer typically comprising at least 50 mol % of propylene; butene polymer is a polymer typically comprising at least 50 mol % butene; and soon.

An "alpha-olefin" is an olefin having a double bond at the alpha (or 1-) position. A "linear alpha-olefin" or "LAO" is an olefin with a double bond at the alpha position and a linear hydrocarbon chain. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornene.

The ethylene copolymer can have an ethylene content from a low of about 20 wt %, about 35 wt %, about 40 wt %, or about 45 wt % to a high of about 65 wt %, about 70 wt %, about 80 wt %, or about 85 wt %, based on the combined weight of the ethylene monomer and the one or more comonomers, e.g., propylene, polymerized to produce the ethylene copolymer. For example, the ethylene copolymer can have an ethylene content of about 25 wt % to about 80 wt %, about 30 wt % to about 75 wt %, about 35 wt % to about 70 wt %, or about 40 wt % to about 65 wt %, based on the combined weight of the ethylene monomer and the one or more comonomers, e.g., propylene, polymerized to produce the ethylene copolymer. As such, the comonomer content, e.g., propylene, in the ethylene copolymer can be from a low of about 15 wt %, about 20 wt %, about 25 wt %, or about 20 wt % to a high of about 50 wt %, about 60 wt %, about 70 wt %, or about 80 wt %. In at least one specific embodiment, the comonomer content, e.g., propylene, in the ethylene copolymer can be at least 15 wt %, at least 20 wt %, at least 25 wt %, at least 30 wt %, or at least 35 wt %, based on the combined weight of the ethylene monomer and the comonomer(s) polymerized to produce the ethylene copolymer.

The ethylene copolymer can have a comonomer, e.g., propylene, content from a low of about 15 wt %, about 20 wt %, or about 25 wt % to a high of about 50 wt %, about 77 wt %, or about 80 wt %, based on the combined weight of the ethylene monomer and the comonomer polymerized to produce the ethylene copolymer. For example, the ethylene copolymer can have a comonomer, e.g., propylene, content from about 25 wt % to about 80 wt %, about 10 wt % to about 75 wt %, about 35 wt % to about 70 wt %, or at least 40 wt % to about 80 wt %, based on the combined weight of the ethylene monomer and the comonomer polymerized to produce the ethylene copolymer.

The ethylene copolymer can have a non-conjugated diene or termonomer content of about 15 wt % or less, about 12 wt % or less, about 9 wt % or less, about 6 wt % or less, about 3 wt % or less, or about 1 wt % or less. For example, the ethylene copolymer can have a non-conjugated diene content of about 2 wt % to about 14 wt %, about 6 wt % to about 13 wt %, about 4 wt % to about 8 wt %, or about 1 wt % to about 11 wt %. Particularly preferred ethylene copolymers can contain no diene. If one or more dienes are present (e.g., an ethylene-propylene-diene terpolymer), preferably the diene is a norbornene-derived diene such as ethylidene norbornene (ENB) or vinylidene norbornene (VNB). Diene content can be measured according to ASTM D 6047. In at least one example the ethylene copolymer can be free from any diene.

The ethylene copolymer can have a density of 0.87 g/cm$^3$ or less, about 0.865 g/cm$^3$ or less, about 0.86 g/cm$^3$ or less, or about 0.855 g/cm$^3$ or less. For example, the ethylene copolymer can have a density of about 0.84 g/cm$^3$ to about 0.85 g/cm$^3$, about 0.86 g/cm$^3$ to about 0.87 g/cm$^3$, about 0.88 g/cm$^3$ to about 0.89 g/cm$^3$, or about 0.90 g/cm$^3$ to about 0.92 g/cm$^3$.

The ethylene copolymer can have a heat of fusion (Hf), if detected, of less than 20 J/g, less than 15 J/g, less than 10 J/g, less than 5 J/g, or less than 3 J/g. In at least one example the ethylene copolymer can have a heat of fusion that is indiscernible.

The ethylene copolymer can have an ethylene or propylene crystallinity, if measurable, of less than 10 wt %, less than 7.5 wt %, less than 5 wt %, less than 2.5 wt %, or less than 1 wt %. In at least one example, the ethylene copolymer can have an ethylene or propylene crystallinity that is undetectable. In a preferred embodiment, the ethylene copolymer has a crystallinity, as determined by DSC, of less than 20%, preferably less than 10%, preferably less than 5%, preferably less than 1%.

The ethylene copolymer can have a melting point (Tm, peak first melt), if detected, of 60° C. or less, 50° C. or less, 40° C. or less, or 35° C. or less. The ethylene copolymer can have a glass transition temperature (Tg) of −30° C. or less, −40° C. or less, −50° C. or less, or −60° C. or less.

The ethylene copolymer can have a weight average molecular weight (Mw) from a low of about 50 kg/mol, about 75 kg/mol, about 150 kg/mol, or about 300 kg/mol to a high of about 600 kg/mol, about 900 kg/mol, about 1,300 kg/mol, about 2,000 kg/mol, about 2,500 kg/mol, or about 3,000 kg/mol. For example, the ethylene copolymer can have a Mw of about 50 kg/mol to about 3,000 kg/mol, about 100 kg/mol to about 2,000 kg/mol, or about 200 kg/mol to about 1,000 kg/mol.

The ethylene copolymer can have a ratio of weight average molecular weight (Mw) to number average molecular weight (Mn) or (Mw/Mn) from a low of about 1, about 1.5, or about 2 to a high of about 20, about 30, or about 40. For example, the ethylene copolymer can have an Mw/Mn of about 1.4 to about 20, or about 1.6 to 10, or about 1.8 to 3.5, or about 1.8 to 2.5.

The ethylene copolymer can have a Mooney viscosity, ML(1+4) at 125° C., from a low of about 10, about 13, about 17, or about 23 to a high of about 80, about 87, about 93, or about 100. For example, the ethylene copolymer can have a Mooney viscosity, ML(1+4) at 125° C., of about 10 to 100, about 15 to about 90, or about 20 to about 85.

As discussed and described above and elsewhere herein, the particular process of making the polypropylene polymer and the ethylene copolymer is not critical, as it can be made by slurry, solution, gas-phase, high-pressure, or any other suitable processes, or combinations of processes, through the use of catalyst systems appropriate for the polymerization of polyolefins, such as Ziegler-Natta-type catalysts, metallocene-type catalysts, other appropriate catalyst systems or combinations thereof. In a preferred embodiment, the propylene polymers are made by the catalysts, activators, and processes discussed and described in U.S. Pat. Nos. 5,741,563; 6,342,566; 6,384,142; and WO Publication Nos. WO 03/040201 and WO 97/19991. Such catalysts are well known in the art, and are described in, for example, "Ziegler Catalysts," Gerhard Fink, Rolf Mülhaupt, and Hans H. Brintzinger, eds., Springer-Verlag 1995; Resconi et al., "Selectivity in Propene Polymerization with Metallocene Catalysts," 100 CHEM. REV. pp. 1253-1345 (2000); and "I, II Metallocene-Based Polyolefins" (Wiley & Sons 2000).

Impact Copolymer

The impact copolymer (ICP) can include the polypropylene polymer and the ethylene copolymer. In at least one example, the impact copolymer can include a polypropylene homopolymer (HPP) or a polypropylene random copolymer (RCP) component and an ethylene-propylene copolymer. The morphology can be such that the matrix phase is primarily the polypropylene polymer and the dispersed phase can be primarily the ethylene copolymer phase.

The impact copolymer can have a total propylene content of at least 75 wt %, at least 80 wt %, at least 85 wt %, at least 90 wt %, or at least 95 wt %, based on the combined weight of the polypropylene polymer and the ethylene copolymer. The impact copolymer can have a total propylene content of at least 75 wt %, at least 80 wt %, at least 85 wt %, at least 90 wt %, or at least 95 wt %, based on the total weight of the impact copolymer. For example, if the impact copolymer includes the polypropylene polymer, the ethylene copolymer, and a second polypropylene polymer, with no other components being present, the impact copolymer can have a total propylene content of at least 75 wt %, at least 80 wt %, at least 85 wt %, at least 90 wt %, or at least 95 wt %, based on the combined weight of the polypropylene polymer, the ethylene copolymer, and the second polypropylene polymer or said another way the total weight of the impact copolymer.

The impact copolymer (as opposed to the individual polymer components) can have a total comonomer content from a low of about 1 wt %, about 5 wt %, about 9 wt %, or about 12 wt % to a high of about 18 wt %, about 23 wt %, about 28 wt %, or about 35 wt %, based on the total weight of the impact copolymer. For example, the impact copolymer can have a total comonomer content of about 1 wt % to about 35 wt %, about 2 wt % to about 30 wt %, about 3 wt % to about 25 wt %, or about 5 wt % to about 20 wt %, based on the total weight of the impact copolymer.

The impact copolymer can have an ethylene copolymer content from a low of about 5 wt %, about 8 wt %, about 10 wt %, about 15 wt %, about 25 wt %, about 35 wt %, or about 45 wt % to a high of about 55 wt %, about 65 wt %, about 75 wt %, or about 85 wt %, based on the combined weight of the polypropylene polymer and the ethylene copolymer. Said another way, the amount of the ethylene copolymer can be such that the impact copolymer contains from about 5 wt % to about 85 wt % of the ethylene copolymer, based on the combined weight of the polypropylene polymer and the ethylene copolymer. For example, the impact polymer can have an ethylene copolymer content of about 5 wt % to about 80 wt %, about 5 wt % to about 60 wt %, about 5 wt % to about 50 wt %, about 5 wt % to about 40 wt %, about 6 wt % to about 35 wt %, about 7 wt % to about 30 wt %, or about 8 wt % to about 30 wt %, based on the combined weight of the polypropylene polymer and the ethylene copolymer. In another example, the impact copolymer can have an ethylene copolymer content of at least 5 wt %, at least 10 wt %, at least 15 wt %, at least 20 wt %, at least 25 wt %, at least 30 wt %, at least 40 wt %, or at least 45 wt % to a high of about 50 wt %, about 60 wt %, about 70 wt %, about 80 wt %, or about 85 wt %.

In one or more embodiments, the amount of the ethylene copolymer present within the pores of the polypropylene particles can be at least 20 wt %, at least 40 wt %, at least 60 wt %, at least 80 wt %, or at least 90 wt %, based on the total weight of the ethylene copolymer in the impact copolymer. For example, the amount of the ethylene copolymer present within the pores of the polypropylene particles can be from about 20 wt % to about 100 wt %, about 30 wt % to about 90 wt %, about 50 wt % to about 80 wt %, or about 55 wt % to about 65 wt %, based on the total weight of the ethylene copolymer in the impact copolymer.

The impact copolymer can have a ratio of the intrinsic viscosity (IV) of the ethylene copolymer component to the intrinsic viscosity of the polypropylene component from a low of about 0.5, about 1.5, about 3, or about 4 to a high of about 6, about 9, about 12, or about 15, as measured according to ASTM D 1601 (135° C. in decalin). For example, the impact copolymer component can have a ratio of the intrinsic viscosity of about 0.5 to about 15, about 0.75 to about 12, or about 1 to about 7, as measured according to ASTM D 1601 (135° C. in decalin).

The impact copolymer can have a propylene meso diads content in the polypropylene component 90% or more, 92% or more, about 94% or more, or about 96% or more.

The impact copolymer can have a weight average molecular weight (Mw) from a low of about 20 kg/mol, about 50 kg/mol, about 75 kg/mol, about 150 kg/mol, or about 300 kg/mol to a high of about 600 kg/mol, about 900 kg/mol, about 1,300 kg/mol, or about 2,000 kg/mol. For example, the ethylene copolymer can have a Mw of about 50 kg/mol to about 3,000 kg/mol, about 100 kg/mol to about 2,000 kg/mol, or about 200 kg/mol to about 1,000 kg/mol.

The impact copolymer can have a melt flow rate (MFR) from a low of about 1 dg/min, about 15 dg/min, about 30 dg/min, or about 45 dg/min to a high of about 75 dg/min, about 100 dg/min, about 200 dg/min, or about 300 dg/min. For example, the impact copolymer can have an MFR of about 1 dg/min to about 300 dg/min, about 5 dg/min to about 150 dg/min, or about 10 dg/min to about 100 dg/min, or about 20 dg/min to about 60 dg/min.

The impact copolymer can have a melting point (Tm, peak second melt) of at least 100° C., or at least 110° C., or at least 120° C., or at least 130° C., or at least 140° C., or at least 150° C., or at least 160° C., or at least 165° C. For example, the impact copolymer can have a melting point from at least 100° C. to about 175° C., about 105° C. to about 165° C., about 105° C. to about 145° C., or about 100° C. to about 155° C.

The impact copolymer can have a heat of fusion (Hf, DSC second heat) from a high of about 60 J/g, about 75 J/g, about 85 J/g, or about 95 J/g to a low of about 20 J/g, about 30 J/g, about 40 J/g, or about 50 J/g. In at least one embodiment, the impact copolymer can have a heat of fusion of 60 J/g or more, 70 J/g or more, 80 J/g or more, 90 J/g or more, about 95 J/g or more, or about 100 J/g or more.

The impact copolymer can have glass transition temperature (Tg) of the ethylene copolymer component of −20° C. or less, −30° C. or less, −40° C. or less, or −50° C. or less.

The impact copolymer can have a 1% secant flexural modulus from a low of about 300 MPa, about 600 MPa, about 800 MPa, about 1,100 MPa, or about 1,200 MPa to a high of about 1,500 MPa, about 1,800 MPa, about 2,100 MPa, about 2,600 MPa, or about 3,000 MPa, as measured according to ASTM D 790 (A, 1.3 mm/min). For example, the impact copolymer can have a flexural modulus from about 300 MPa to about 3,000 MPa, about 500 MPa to about 2,500 MPa, about 700 MPa to about 2,000 MPa, or about 900 MPa to about 1,500 MPa, as measured according to ASTM D 790 (A, 1.3 mm/min).

The impact copolymer can have a notched Izod impact strength at 23° C. of about 2.5 KJ/m$^2$ or more, about 5 KJ/m$^2$ or more, about 7.5 KJ/m$^2$ or more, about 10 KJ/m$^2$ or more, about 15 KJ/m$^2$ or more, about 20 KJ/m$^2$ or more, about 25 KJ/m$^2$ or more, or about 50 KJ/m$^2$ or more, as measured according to ASTM D 256 (Method A). For example, the impact copolymer can have a notched Izod impact strength at 23° C. from a low of about 3 KJ/m$^2$, about 6 KJ/m$^2$, about 12 KJ/m$^2$ or about 18 KJ/m$^2$ to a high of about 30 KJ/m$^2$, about 35 KJ/m$^2$, about 45 KJ/m$^2$, about 55 KJ/m$^2$, or about 65 KJ/m$^2$, as measured according to ASTM D 256 (Method A).

The impact copolymer can have a Gardner impact strength at −30° C. from a low of about 2 KJ/m$^2$, about 3 KJ/m$^2$, about 6 KJ/m$^2$, about 12 KJ/m$^2$, or about 20 KJ/m$^2$ to a high of about 55 KJ/m$^2$, about 65 KJ/m$^2$, about 75 KJ/m$^2$, about 85 KJ/m$^2$, about 95 KJ/m$^2$, or about 105 KJ/m$^2$, as measured according to ASTM D 5420 (GC). For example, the impact copolymer can have a Gardner impact strength at −30° C. of about 2 KJ/m$^2$ to about 100 KJ/m$^2$, about 3 KJ/m$^2$ to about 80 KJ/m$^2$, or about 4 KJ/m$^2$ to about 60 KJ/m$^2$, as measured according to ASTM D 5420 (GC).

The impact copolymer can have a heat deflection temperature (HDT) from a low of about 75° C., about 83° C., about 87° C., or about 92° C. to a high of about 95° C., about 100° C., about 105° C., or about 120° C., as measured according to ASTM D 648 (0.45 MPa). For example, the impact copolymer can have a heat deflection temperature of about 80° C. or more, about 85° C. or more, about 90° C. or more, or about 95° C. or more, as measured according to ASTM D 648 (0.45 MPa).

In at least one specific embodiment, the impact copolymer can have an MFR from about 6 dg/min to about 200 dg/min; a 1% Secant Flexural Modulus greater than 820 MPa, and an Izod Impact at 25° C. of greater than 26 KJ/m$^2$.

In at least one specific embodiment, the impact copolymer can have an ethylene copolymer concentration of at least about 13 wt % to about 35 wt %, based on the combined weight of the polypropylene particles and the ethylene copolymer, a notched Izod impact strength at 23° C. of at least 25 KJ/m$^2$ to about 110 KJ/m$^2$, and a flexural modulus less than 2,100 MPa to about 1,400 MPa. In at least one specific embodiment, the impact copolymer can have an ethylene copolymer concentration of at least about 20 wt % to about 30 wt %, based on the combined weight of the polypropylene particles and the ethylene copolymer, a notched Izod impact strength at 23° C. of at least 35 KJ/m$^2$ to about 90 KJ/m$^2$, and a flexural modulus less than 1,900 MPa to about 1,500 MPa. Alternately, in another specific embodiment, the impact copolymer can have an ethylene copolymer concentration of at least about 10 wt % to about 35 wt %, based on the combined weight of the polypropylene polymer and the ethylene copolymer, a notched Izod impact strength at 23° C. of at least 5 KJ/m$^2$ to about 75 KJ/m$^2$, and a flexural modulus less than 1,200 MPa to about 1,900 MPa. In at least one specific embodiment, the impact copolymer can have an ethylene copolymer concentration of at least about 15 wt % to about 25 wt %, based on the combined weight of the polypropylene polymer and the ethylene copolymer, a notched Izod impact strength at 23° C. of at least 15 KJ/m$^2$ to about 65 KJ/m$^2$, and a flexural modulus less than 1,300 MPa to about 1,800 MPa.

In at least one specific embodiment, the impact copolymer can have an ethylene copolymer having a weight average molecular weight of at least 30 kg/mol to about 200 kg/mol, a notched Izod impact strength at 23° C. of at least 25 KJ/m$^2$ to about 110 KJ/m$^2$, and a MFR less than 20 dg/min to about 100 dg/min. In at least one specific embodiment, the impact copolymer can have an ethylene copolymer having a weight average molecular weight of at least 45 kg/mol to about 150 kg/mol, a notched Izod impact strength at 23° C. of at least 28 KJ/m$^2$ to about 85 KJ/m$^2$, and a MFR of less than about 30 dg/min to about 90 dg/min.

Additives

Additives such as antioxidants and stabilizers (including UV stabilizers and other UV absorbers, such as chain-breaking antioxidants), fillers (such as mineral aggregates, fibers, clays, and the like), nucleating agents, slip agents, block, antiblock, pigments, dyes, color masterbatches, waxes, processing aids (including pine or coal tars or resins and asphalts), neutralizers (such as hydro talcite), adjuvants, oils, lubricants, low molecular weight resins, surfactants, acid scavengers, anticorrosion agents, cavitating agents, blowing agents, quenchers, antistatic agents, cure or cross linking agents or systems (such as elemental sulfur, organo-sulfur compounds, and organic peroxides), fire retardants, coupling agents (such as silane), and combinations thereof may also be present in the impact copolymer compositions described herein. Typical additives used in polypropylene and polypropylene blends are described in POLYPROPYLENE HANDBOOK 2ND ED., N. Pasquini, ed. (Hanser Publishers, 2005). The additives may be present in the typically effective amounts well known in the art, preferably at 0.001 to 50 wt % (preferably 0.01 to 20 wt %, preferably 0.1 to 10 wt %, preferably 0.1 to 1 wt %), based upon the weight of the composition. Pigments, dyes, and other colorants may be present from 0.01 to 10 wt % (preferably 0.1 to 6 wt %).

As used herein, "additives" include, for example, stabilizers, surfactants, antioxidants, anti-ozonants (e.g., thioureas), fillers, colorants, nucleating agents, anti-block agents, UV-blockers/absorbers, coagents (cross-linkers and cross-link enhancers), hydrocarbon resins (e.g., Oppera™ resins), and slip additives and combinations thereof. Primary and secondary antioxidants include, for example, hindered phenols, hindered amines, and phosphates. Slip agents include, for example, oleamide and erucamide. Examples of fillers include carbon black, clay, talc, calcium carbonate, mica, silica, silicate, and combinations thereof. Other additives include dispersing agents and catalyst deactivators such as calcium stearate, hydrotalcite, and calcium oxide, and/or other acid neutralizers known in the art. In certain embodiments, cross-linkers and cross-link enhancers are absent from the propylene impact copolymers.

Antioxidants and Stabilizers

Particularly useful antioxidants and stabilizers such as organic phosphites, hindered amines (including high and low molecular weight hindered amine light stabilizers, or "HALS"), and phenolic antioxidants can be present in the impact copolymer from about 0.001 wt % to about 2 wt % (preferably from about 0.01 wt % to about 0.8 wt %, and more preferably from about 0.02 wt % to about 0.5 wt %). Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-iso-cyanurate (IRGANOX 3114). Preferred antioxidants include phenolic antioxidants, such as Irganox 1010, Irganox, 1076 both available from Ciba-Geigy.

In another embodiment, the impact copolymer composition can include one or more phenolic antioxidants. Preferred examples of phenolic antioxidants include substituted phenols such as 2,6-di-t-butylphenol in which a hydrogen atom at 2 and/or 6 position is substituted by an alkyl residue. Typical examples of the phenolic antioxidant include 2,6-dit-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])]propionate, and pentaerythrityltetrakis-[3-(3,5-di-t-butyl-4-hydroxyphenyl)] propionate.

Fillers

The impact copolymer compositions discussed and described herein can include at least one filler. The classes of materials described herein that are useful as fillers can be utilized alone or admixed to obtain desired properties. In any of the embodiments, filler may be present at 0.1 to 50 wt % (preferably 1 to 40 wt %, preferably 2 to 30 wt %, preferably 5 to 20 wt %) based on the weight of the total composition. Filler content is equated with the wt % ash content as determined by the ISO 3451-1 (A) test method.

Desirable fillers include, but not limited to, mineral aggregates (natural or synthetic), fibers, carbon black, graphite, wollastonite, natural and synthetic clays including nanoclays and organoclays, sand, glass beads, and the like, and any other porous or nonporous fillers and supports known in the art.

In preferred embodiments the filler has a median particle diameter of about 0.1 microns to about 100 microns (preferably about 0.5 microns to about 50 microns, and more preferably about 1 micron to about 20 microns). In other preferred embodiments the filler has a filler shape that is needle-like or plate-like, with an aspect ratio greater than 1.2 (preferably greater than 2, preferably greater than 3, preferably greater than 5, preferably greater than 10, preferably from 2 to 20, preferably from 3-10), where the aspect ratio is the ratio of the longest dimension to the shortest dimension of the particles, on average, and is typically reported by filler manufacturers. In other embodiments the filler has an aspect ratio of essentially 1 (0.9 to 1.1); i.e., it is not needle-like or plate-like but is essentially spherical. In another embodiment, the filler is pulverized. Useful fillers have a specific surface area of 10 $m^2/cm^3$ to 300 $m^2/cm^3$.

Mineral Aggregates

Preferred natural or synthetic mineral fillers include talc, mica, wollastonite, titanium dioxide, silicon carbide, silica, silicon dioxide and other oxides of silica (precipitated or not), calcium silicate, calcium and barium sulfates, calcium carbonate (calcite), lead carbonate, magnesium silicate, magnesium oxysulfates, antimony oxide, zinc white, lithopone, zircon, corundum, spinel, apatite, Barytes powder, magnesiter, dolomite, zinc borate, hydrotalcite compounds of the ions Mg, Ca, or Zn with Al, Cr or Fe and $CO_3$ and/or $HPO_4$ (hydrated or not), quartz powder, hydrochloric magnesium carbonate, alumina, chrome, phosphorous and brominated flame retardants, antimony trioxide, silicone, other metal oxides, other metal carbonates, other metal hydroxides, and blends thereof.

Fibers

Preferred fibers include glass fibers (long or short), carbon fibers, and natural and synthetic polymer fibers including polyethylene terephthalate (PET) fibers and rayon fibers.

Clays

Preferred clays include nanoclays or organoclays to produce a nanocomposite. These clays can include one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfoniums derivatives of aliphatic, aromatic or arylaliphatic amines, phosphines or sulfides. The organoclay may be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and/or florine mica. In another embodiment the filler is a nano-clay with mean particle diameter of less than 1 micron.

Slip Agent

The impact copolymer can include one or more slip agents. Preferably, the slip agent is a fast bloom slip agent, and can be a hydrocarbon having one or more functional groups selected from hydroxide, aryls and substituted aryls, halogens, alkoxys, carboxylates, esters, carbon unsaturation, acrylates, oxygen, nitrogen, carboxyl, sulfate and phosphate. In one embodiment the slip agent is an ionic compound. Ionic slip agents include salt derivatives of aromatic or aliphatic hydrocarbon oils, notably metal salts of fatty acids, including metal salts of carboxylic, sulfuric, and phosphoric aliphatic saturated or unsaturated acid having a chain length of 7 to 26 carbon atoms, preferably 10 to 22 carbon atoms. Suitable fatty acids include the monocarboxylic acids lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, and the like, and the corresponding sulfuric and phosphoric acids. Suitable metals include Li, Na, Mg, Ca, Sr, Ba, Zn, Cd, Al, Sn, Pb and so forth. Suitable salts include magnesium stearate, calcium stearate, sodium stearate, zinc stearate, calcium oleate, zinc oleate, magnesium oleate, and so on, as well as the corresponding metal higher alkyl sulfates and metal esters of higher alkyl phosphoric acids.

In another embodiment, fatty acid metal salts can be substantially absent from the impact copolymer. In one embodiment the slip agent is a non-ionic functionalized compound. Suitable functionalized compounds include: (a) esters, amides, alcohols and acids of oils including aromatic or aliphatic hydrocarbon oils, for example, mineral oils, naphthenic oils, paraffinic oils; natural oils such as castor, corn, cottonseed, olive, rapeseed, soybean, sunflower, other vegetable and animal oils, and so on; representative functionalized derivatives of these oils include, for example, polyol esters of monocarboxylic acids such as glycerol monostearate, pentaerythritol monooleate, and the like, saturated and unsaturated fatty acid amides or ethylenebis(amides), such as oleamide, erucamide, linoleamide, and mixtures thereof, glycols, polyether polyols like Carbowax, and adipic acid, sebacic acid, and the like; (b) waxes, such as carnauba wax, microcrystalline wax, polyolefin waxes, e.g. polyethylene waxes; (c) fluoro-containing polymers such as polytetrafluoroethylene, fluorine oils, fluorine waxes and so forth; and (d) silicon compounds such as silanes and silicone polymers, including silicone oils, polydimethylsiloxane, amino-modified polydimethylsiloxane, and so on.

Suitable fatty amides can be represented by the formula: $R_1C(O)NHR_2$, where $R_1$ is a saturated or unsaturated alkyl group having from 7 to 26 carbon atoms, preferably 10 to 22 carbon atoms, and $R_2$ is independently hydrogen or a saturated or unsaturated alkyl group having from 7 to 26 carbon atoms, preferably 10 to 22 carbon atoms. Compounds according to this structure include for example, palmitamide, stearamide, arachidamide, behenamide, oleamide, erucamide, linoleamide, stearyl stearamide, palmityl palmitamide, stearyl arachidamide and mixtures thereof.

Suitable ethylenebis(amides) can be represented by the formula: $RC(O)NHCH_2CH_2NHC(O)R$, where each R is independently is a saturated or unsaturated alkyl group having from 7 to 26 carbon atoms, preferably 10 to 22 carbon atoms. Compounds according to this structure include for example, stearamidoethylstearamide, stearamidoethylpalmitamide, palmitamido-ethylstearamide, ethylenebisstearamide, ethylenebisoleamide, stearylerucamide, erucamidoethylerucamide, oleamidoethyloleamide, erucamidoethyloleamide, oleamidoethylerucamide, stearamidoethylerucamide, erucamidoethylpalmitamide, palmitamidoethyloleamide and mixtures thereof.

Commercially available examples of fatty amides include Ampacet 10061, which includes 5% of a 50:50 mixture of the primary amides of erucic and stearic acids in polyethylene; Elvax 3170, which includes a similar blend of the amides of erucic and stearic acids in a blend of 18% vinyl acetate resin and 82% polyethylene. These slip agents are available from DuPont. Slip agents also are available from Croda Universal, including Crodamide OR (an oleamide), Crodamide SR (a stearamide), Crodamide ER (an erucamide), and Crodamide BR (a behenamide); and from Crompton, including Kemamide S (astearamide), Kemamide B (a behenamide), Kemamide O (an oleamide), Kemamide E (an erucamide), and Kemamide (an N,N'-ethylenebisstearamide). Other commercially available slip agents include Erucamid ER erucamide.

Generally preferred concentrations of the slip agent are in the range of from about 0.001% to about 0.5% by weight of the composition, preferably of from about 0.01% to about 0.4% by weight and most preferably of from about 0.1 parts to about 0.3% by weight based on the weight of the composition.

Nucleating Agent

Suitable nucleating agents for use herein are disclosed in *Plastics Additive Handbook*, 5$^{th}$ Ed.; H. Zweifel, Ed.; Hanser-Gardner Publications, (2001); Chapter 18, pp. 949-972. Suitable nucleating agents for use herein are also disclosed by H. N. Beck in *Heterogeneous Nucleating Agents for Polypropylene Crystallization*, J. APPLIED POLY. SCI. Vol. 11, pp. 673-685 (1967) and in *Heterogeneous Nucleation Studies on Polypropylene*, J. POLY. SCI.: POLY. LETTERS, Vol. 21, pp. 347-351 (1983). Useful nucleating agents can be either homogeneous nucleating agents (i.e., melt-soluble, meaning dissolved into the polyolefin) or heterogeneous nucleating agents (i.e., melt-insoluble, meaning suspended or dispersed in the polyolefin). Typical nucleating agents promote at least one crystal polymorph for the polyolefin. For example, when the polyolefin is isotactic polypropylene (iPP), known crystal forms include the so-called alpha, beta, and gamma polymorphs; useful nucleating agents therefore include those that promote alpha crystals in iPP, those that promote beta crystals in iPP, and those that promote gamma crystals in iPP. Suitable nucleating agents also include those that promote crystallization in syndiotactic polypropylene (sPP).

Suitable nucleating agents preferably improve one or more performance parameters of the polyolefin, such as increased clarity, reduced haze, increased stiffness, increased impact toughness, increased heat deflection temperature; and/or processing parameters, such as reduced cycle time or increased line speed. Suitable nucleating agents can be organic, inorganic, or polymeric, and may include combinations of one or more nucleating agent.

As used herein, a "nucleating agent" is any compound or blend of compounds whose overall concentration is less than 0.50 wt %, by weight of the polymer or blend to which it is added, that reduces the crystallization half time at 135° C. by at least 50%. Nonlimiting examples of nucleating agents include bicyclo[2.1.1]heptane-2,3-dicarboxylic acid (cadmium or disodium salt), bicyclo[2.1.1]hept-5-ene-2,3-dicarboxylic acid (cadmium or disodium salt), amorphous silicon dioxide, metal oxides, aluminum salts, talc, silica and surface-modified silica, dibenzyl sorbitol, adipic acid, benzoic acid, sodium benzoate, 2-mercaptobenzimidazol, potassium dehydroabietate, sodium 2,2-methylene-bis-(4,6-di-tertbutylphenylphosphate), N,N-dicyclohexyl-2,6-naphthalene dicarboxamide, 1,3:2,4-bis(3,4-dimethylbenzylidene) sorbitol, and blends thereof. In a particular embodiment, the nucleating agent is a composition comprising silicon dioxide, an alkyl amine and a alkyl-dicarboxylic acid compound (e.g. bicyclo[2.1.1]hept-5-ene-2,3-dicarboxylic acid). The propylene impact copolymers may include within the range from 0.001 wt % or 0.005 wt % to 0.05 wt % or 0.10 wt % or 0.5 wt %, by weight of the impact copolymer, of a nucleating agent or blend thereof, or stated another way, within the range from 200 ppm or 300 ppm to 1,300 ppm or 1,500 ppm. The presence of nucleating agents may benefit the impact copolymers by reducing the crystallization rate and hence improve the cycle time (injection, packing, cooling and part ejection) in the injection molding process. In such embodiments, the propylene impact copolymers possess a crystallization half-time at 135° C. is less than 15 minutes or 12 minutes or 10 minutes or 5 minutes or 2 minutes, or less than 60 seconds or 40 seconds. The cycle time for injection molding is improved in certain embodiments such that the cycle time is less than 80 seconds or 70 seconds or 60 seconds.

The impact copolymer composition described herein may also include the addition of at least one nucleating agent. Typically, nucleating agents increase the rate of crystallization (isothermal and/or non-isothermal) of the polyolefin. A special class of nucleating agents, known as clarifying agents, typically reduces the size of crystallites, thereby improving the transparency and clarity of articles made from the polyolefin.

The following list is intended to be illustrative of suitable choices of nucleating agents for inclusion in the instant formulations. Suitable nucleating agents include fillers such as silica, kaolin, carbon black, and talc; metal salts including sodium salts, lithium salts, potassium salts, phosphonic acid salts, carboxylate salts, and aromatic carboxylic-acid salts (including norbornene carboxylic-acid salts); metal phosphates (including sodium phosphates), phosphate esters, and phosphate ester salts; metal salts of suberic acid (including the calcium salt); metal salts of hexahydrophthalic acid; salts of disproportionated rosin esters; sorbitol derivatives, including dibenzylidene sorbitol and derivatives, sorbitol acetal and derivatives, and sorbitol di-acetal and derivatives; quinacridone dyes; carboxamide derivatives, including naphthalene carboxamide derivatives; benzenetrisamide derivatives, including 1,3,5-benzenetrisamides described in Blomenhofer, et al, *Macromolecules* 38, pp. 3688-3695 (2005); trimesic acid derivatives; and polymeric nucleating agents such as poly(3-methyl-1-butene), poly(dimethylstyrene), poly(ethylene terephthalate), polyamides (nylons), and polycarbonates.

Other specific examples of suitable nucleating agents are sodium benzoate and sodium naphthenoate, sodium 2,2'-methylenebis(4,6-di-tert-butylphenyl)phosphate, aluminum 2,2'-methylenebis(4,6-di-tert-butylphenyl)phosphate, di(p-tolylidene) sorbitol, dibenzylidene sorbitol, di(p-methylbenzylidene) sorbitol, di(p-ethylbenzylidene) sorbitol, bis(3,4-dimethylbenzylidene) sorbitol, and N',N'-dicyclohexyl-2,6-naphthalenedicarboxamide. Other suitable nucleating agents are disclosed in U.S. Pat. Nos. 4,016,118; 4,371,645; 5,049, 605; 6,235,823; U.S. Patent Application Publication No. 2004/0132884; WO Publication Nos. WO 02/046300 and WO 03/102069; and EP Patent No. EP 776933.

Additional specific examples of suitable nucleating agents include: those available from Milliken Chemical under the "Millad" and "Hyperform" tradenames, including Millad 3905 [DBS, or 1,3:2,4-dibenzylidenesorbitol], Millad 3940 [MDBS, or 1,3:2,4-bis-(p methylbenzylidene)sorbitol], Millad 3988 [DMDBS, or 1,3:2,4-bis(3,4-dimethylbenzylidene)sorbitol], and HPN-68 [2.2.1-heptane-bicyclodicarboxylic acid]; those available from Ciba Specialty Chemicals under the "Irgaclear" and "Irgastab" tradenames, including Irgaclear D [DBS, or 1,3:2,4-dibenzylidenesorbitol] and Irgaclear DM [MDBS, or 1,3:2,4-bis-(p-methylbenzylidene)sorbitol]; those available from Asahi Denka Kogyo and Amfine under the "ADKstab" and "NA" tradenames, including: NA-11 [2,2'-methylenebis(4,6-di-tertbutylphenol)phosphate salt] and NA-21 [2,2'-methylenebis(4,6-ditertbutylphenol) phosphate aluminum complex]; those available from Mitsui Chemicals under the "NC" tradename, including NC-4 [EDBS, or 1,3:2,4-bis-(pethylbenzylidene) sorbitol]; those available from New Japan Chemical under the "NJSTAR", "NU", "Gel All", and "Geniset" tradenames, including NU100 [N,N'-dicyclohexyl-2,6-naphathalene dicarboxamide], NJSTAR [N,N'-dicyclohexyl-2,6-naphathalene diczroxamide], Gel All D [DBS, or 1,3:2,4-dibenzylidenesorbitol], and Gel All MD [MDBS, or 1,3:2,4-bis-(p-methylbenzylidene)sorbitol]; those available from EC Chemical (Japan) under the "EC" tradename, including EC-1 [(1,3:2,4)dimethyldibenzylidene sorbitol] and EC-4 [a sorbitol].

Particularly preferred nucleating agents include dibenzylidene sorbitol derivatives, phosphate ester derivatives, and benzenetrisamide derivatives. Particularly preferred nucleating agents include 1,3:2,4-bis(3,4-dimethylbenzylidene)sorbitol (available as Millad 3988 from Milliken Chemical; Spartanburg, S.C.), 2.2.1-heptane-bicyclodicarboxylic acid (available as HPN-68 from Milliken Chemical; Spartanburg, S.C.), 1,3:2,4-bis-(pmethylbenzylidene) sorbitol (available as Irgaclear DM from Ciba Specialty Chemicals; Basel, Switzerland), 2,2'-methylenebis(4,6-di-tertbutylphenol)phosphate salt (available as NA-11 from Amfine Chemical; Upper Saddle River, N.J.), and sodium benzoate (available from Ciba Specialty Chemicals; Basel, Switzerland).

The nucleating agent(s) can be present in the impact copolymer in an amount of about 0.01 wt % to about 1 wt % (about 100 ppm to about 10,000 ppm), preferably about 0.02 wt % to about 0.5 wt % (about 200 to about 5,000 ppm), preferably about 0.03 wt % to about 0.3 wt % (about 300 to about 3,000 ppm), preferably about 0.05 wt % to about 0.25 wt % (about 500 to about 2,500 ppm), based upon the weight of the composition (where ppm is parts-per-million by weight).

Crosslinking Agents

In another embodiment, the impact copolymer can include one or more crosslinking agents. Preferred crosslinking agents include those having functional groups that can react with functional groups present on the polyolefin, including alcohols, multiols, amines, diamines and/or triamines. Particular examples of crosslinking agents can include, but are not limited to, polyamines such as ethylene-diamine, diethylene-triamine, hexamethylene-diamine, diethylaminopropyl-amine, and menthane-diamine.

Oils

In some embodiments, oils may be present in the impact copolymer. Useful oils include conventional mineral oils, such as paraffinic or naphthenic mineral oils, white oils, technical white oils, bright stocks, Group I, Group II, Group III or Group IV basestocks, vegetable oils, or the like, and particularly preferred oils include those described in U.S. Publication No. 2008/0045638, page 14, paragraph [0243] to page 22, paragraph [0382], particularly those described as "NFP's", or polyalphaolefins. In other embodiments, functionalized oils other than amide slip agents can be substantially absent from the polyolefin composition.

In preferred embodiments, naphthenic and aromatic mineral oils can be substantially absent from the impact copolymer, preferably present at 0 wt %. In another embodiment, aromatic moieties and carbon-carbon unsaturation can be substantially absent from the impact copolymer. Aromatic moieties include a compound whose molecules have the ring structure characteristic of benzene, naphthalene, phenanthrene, anthracene, etc.

Tackifiers

In another embodiment, tackifiers may be blended with the impact copolymer. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the polar groups can be substantially absent from the tackifier, or preferably polar groups are not present.) In some embodiments the tackifier has a softening point (Ring and Ball, ASTM E 28) of 80 to 140° C., preferably 100 to 130° C.

Tackifiers, if present, are typically present at about 1 wt % to about 50 wt %, preferably about 2 wt % to about 40 wt %, preferably about 5 wt % to about 20 wt %, based upon the weight of the composition. Preferably however, tackifier is not present, or is present at less than 10 wt %, or preferably at less than 5 wt %, or preferably at less than 1 wt %.

Waxes

One or more waxes can be combined with the impact copolymer. Suitable waxes can include, but are not limited to, polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, ricebran wax, jojoba wax, bayberry wax, montan wax, peat wax, ozokerite wax, ear wax, ceresin wax, petroleum wax, paraffin wax, polyethylene wax, chemically modified hydrocarbon wax, substituted amide wax, and combinations and derivatives thereof. In some embodiments, the polar and non-polar waxes may be used together in the same composition. In a preferred embodiment, the impact copolymer includes no wax.

The desirable properties of the propylene impact copolymer may be adjusted in part by the balance of properties between the polypropylene matrix and the elastomeric domains (such as the ethylene copolymer). In a particular embodiment, the elastomeric polymer has an intrinsic viscosity, $IV^R$, and the polypropylene has an intrinsic viscosity, $IV^{PP}$, where the ratio of $IV^R/IV^{PP}$ is within the range from 1.50 or 1.75 or 1.80 to 2.70 or 3.00 or 4.00. The term "intrinsic viscosity" is used to indicate the viscosity of a solution of a material, in this case a solution of a polymer, in a given solvent at a given temperature, when the polymer composition is at infinite dilution. According to the ASTM standard test method D 1601-78, its measurement involves a standard capillary viscosity measuring device, in which the viscosity of a series of concentrations of the polymer in the solvent at the given temperature are determined. In the case of the polypropylene polymer, ethylene copolymer, and the impact copolymers discussed and described herein, decalin (decahydronaphthalene) is an illustrative suitable solvent and a typical temperature is 135° C. From the values of the viscosity of solutions of varying concentration, the "value" at infinite dilution can be determined by extrapolation. In the case of the present propylene impact copolymers that are reactor produced in situ, the homopolymer portion is initially produced and the intrinsic viscosity of that portion is measured directly. The intrinsic viscosity of the elastomeric portion cannot be measured directly. The intrinsic viscosity of the total propylene impact copolymer product is determined and the intrinsic viscosity of the elastomeric polymer portion ($[\eta]_{elast}$) is calculated as the quotient of the intrinsic viscosity of the total propylene impact copolymer ($[\eta]_{whole}$) less the fraction of polypropylene times its intrinsic viscosity ($[\eta]_{PP}$), all divided by the fraction of the total impact copolymer which is elastomeric polymer. The formula is $[\eta]_{elast}=[[\eta]_{whole}-(1-Fc)[\eta]_{PP}]/Fc$, where Fc is the amount of elastomeric polymer and is stated in terms of a fraction of elastomeric polymer, ethylene/propylene copolymer in a particular embodiment, in the total propylene impact copolymer. This fraction is determined by conventional procedures, including infrared analysis.

The impact copolymer, described in its various embodiments, can be further characterized by possessing an Instrumented Impact (5 mph at −29° C.) of greater than 47 J, a Tensile at Yield of greater than 21.4 MPa, a Gardner Impact (−29° C.) of greater than 34 N-m, or a combination of any two or more of these properties.

Catalysts

The terms "catalyst" and "catalyst compound" are defined to mean a compound capable of initiating catalysis. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, an optional activator, an optional co-activator, and an optional support material, where the system can polymerize monomers to polymer. For the purposes of this disclosure, when catalyst systems are described as comprising neutral stable forms of the components, it is well understood by one of ordinary skill in the art, that the ionic form of the component is the form that reacts with the monomers to produce polymers.

A "scavenger" is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the catalyst compound to form an alkylated catalyst compound, also referred to as an alkylated compound.

Ziegler-Natta PP Catalysts

The polypropylene and/or the ethylene copolymer can generally be produced using Ziegler-Natta catalysts. The Ziegler-Natta catalyst can include 1) a solid titanium catalyst component that can include a titanium compound, a magnesium compound, and an internal electron donor; 2) a co-catalyst such as an organoaluminum compound, and 3) external electron donor(s). Ziegler-Natta catalysts, catalyst systems, and preparations thereof can include supported catalyst systems as discussed and described in U.S. Pat. Nos. 4,990,479 and 5,159,021 and WO Publication No. WO 00/44795. Preferably, the Ziegler-Natta catalyst can include solid titanium and/or magnesium. For example, useful Ziegler-Natta catalysts are typically composed of a transition metal compound from groups 4, 5, 6 and/or 7 (preferably group 4) and an organometallic compound of a metal from groups 11, 12 and/or 13 (preferably group 13) of the periodic table. Well-known examples include TiCl3-Et2AlCl, AlR3-TiCl4, where Et is an ethyl group and R represents an alkyl group, typically a C1 to C20 alkyl group, such as methyl, ethyl, propyl, butyl, pentyl, hexyl, octyl and the like. These catalysts include mixtures of halides of transition metals, especially titanium, chromium, vanadium, and zirconium, with organic derivatives of nontransition metals, particularly alkyl aluminum compounds. As used herein, the new notation for the Periodic Table Groups is used as described in *Chemical and Engineering News*, 63(5), p. 27 (1985).

The Ziegler-Natta catalysts can be obtained by: (1) suspending a dialkoxy magnesium compound in an aromatic hydrocarbon that is liquid at ambient temperature; (2) contacting the dialkoxy magnesium-hydrocarbon composition with a titanium halide and with a diester of an aromatic dicarboxylic acid; and (3) contacting the resulting functionalized dialkoxy magnesiumhydrocarbon composition of step (2) with additional titanium halide.

The Ziegler-Natta catalyst can be combined with one or more co-catalysts. One particularly suitable co-catalyst can include an organoaluminum compound that is halogen free. Suitable halogen free organoaluminum compounds can include, but are not limited to, branched unsubstituted alkylaluminum compounds of the formula $AlR_3$, where R denotes an alkyl radical having 1 to 20 carbon atoms (preferably methyl, ethyl, propyl, butyl, pentyl, hexyl, octyl and the like), such as for example, trimethylaluminum, triethylaluminum, triisobutylaluminum and tridiisobutylaluminum. Additional compounds suitable for use as the cocatalyst are readily available and amply disclosed in the prior art including those disclosed in U.S. Pat. No. 4,990,477. The same or different Ziegler-Natta catalyst(s) can be used in both the initial and subsequent polymerization steps. In a preferred embodiment, the solid catalyst is a magnesium supported $TiCl_4$ catalyst and the organoaluminum cocatalyst is triethylaluminum.

Electron donors can also be used in the formation of Ziegler-Natta catalysts and catalyst systems. For example, an internal electron donor can be used in the formation reaction of the catalyst as the transition metal halide reacts with the metal hydride or metal alkyl. Examples of internal electron donors can include, but are not limited to, amines, amides, ethers, esters, aromatic esters, ketones, nitriles, phosphines, stilbenes, arsines, phosphoramides, thioethers, thioesters, aldehydes, alcoholates, salts of organic acids, or any mixture or combination thereof. In conjunction with an internal donor, an external electron donor can also be used in combination with the catalyst. External electron donors often affect the level of stereoregularity in polymerization reactions.

Another use for an electron donor in the catalyst system can be as an external electron donor and stereoregulator in the polymerization reaction. The same compound can be used in both instances, although typically they are different. Preferred External electron donor materials can include, but are not limited to, organic silicon compounds, e.g., tetraethoxysilane (TEOS) and dicyclopentydimethoxysilane (DCPMS). Internal and external-type electron donors are discussed and described, for example, in U.S. Pat. No. 4,535,068. The use of organic silicon compounds as external electron donors are described, for example, in U.S. Pat. Nos. 4,218,339; 4,395,360; 4,328,122; 4,473,660; 6,133,385; and 6,127,303. Particularly useful electron donors include external electron donors used as stereoregulators, in combination with Ziegler-Natta catalysts.

A particularly useful Ziegler-Natta catalyst can be a magnesium chloride supported titanium catalyst selected from the group of THC-C type catalyst solid systems available from Toho Titanium Corporation of Japan. Particularly preferred donor systems can include those discussed and described in U.S. Pat. No. 6,087,495. For example, the donor can be or include a blend of propyltriethoxysilane (PTES) and dicyclopentyldimethoxysilane (DCPMS), typically a 95/5 mole % blend. Another useful donor is methylcyclohexyl di-methoxysilane (MCMS).

A particular Ziegler-Natta catalyst may produce better results when paired with a particular group of electron donors. Examples of this paring of catalyst and electron donors are disclosed in U.S. Pat. Nos. 4,562,173 and 4,547,552.

Other Ziegler-Natta catalyst compounds are disclosed in European Patent Nos. EP 0103120; EP 1102503; EP 0231102; EP 0703246; U.S. Pat. Nos. RE 33,683; 4,115,639; 4,077,904; 4,302,565; 4,302,566; 4,482,687; 4,564,605; 4,721,763; 4,879,359; 4,960,741; 5,518,973; 5,525,678; 5,288,933; 5,290,745; 5,093,415; and 6,562,905; and U.S. Patent Application Publication No. 2008/0194780.

Metallocene Catalysts

Metallocenes are generally described throughout in, for example, 1 & 2 Metallocene-Based Polyolefins (John Scheirs & W. Kaminsky, eds., John Wiley & Sons, Ltd. 2000); G. G. Hlatky in 181 Coordination Chem. Rev. pp. 243-296 (1999) and in particular, for use in the synthesis of polyethylene in 1 Metallocene-Based Polyolefins pp. 261-377 (2000). Other suitable metallocene catalyst compounds can include, but are not limited to, metallocenes described in U.S. Pat. Nos. 7,179,876; 7,169,864; 7,157,531; 7,129,302; 6,995,109; 6,958,306; 6,884748; 6,689,847; 5,026,798; 5,703,187; 5,747,406; 6,069,213; 7,244,795; 7,579,415; U.S. Patent Application Publication No. 2007/0055028 and 2008/0045679; and WO Publication Nos. WO 97/22635; WO 00/699/22; WO 01/30860; WO 01/30861; WO 02/46246; WO 02/50088; WO 04/022230; WO 04/026921; and WO 06/019494. In at least one specific example, the linear polyethylene can be prepared using a metallocene catalyst as discussed and described in U.S. Patent Application Publication No. 2008/0045679.

Illustrative metallocenes can include, but are not limited to, bis(n-propylcyclopentadienyl)hafnium $X_n$, bis(n-butylcyclopentadienyl)hafnium $X_n$, bis(n-pentylcyclopentadienyl)hafnium $X_n$, (n-propyl cyclopentadienyl)(n-butylcyclopentadienyl)hafnium $X_n$, bis[(2-trimethylsilylethyl) cyclopentadienyl]hafnium $X_n$, bis(trimethylsilyl cyclopentadienyl)hafnium $X_n$, dimethylsilylbis(n-propylcyclopentadienyl)hafnium $X_n$, dimethylsilylbis(n-butylcyclopentadienyl)hafnium $X_n$, bis(1-n-propyl-2-methylcyclopentadienyl)hafnium $X_n$, and (n-propylcyclopentadienyl)(1-n-propyl-3-n-butylcyclopentadienyl)hafnium $X_n$, where X is selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, substituted derivatives thereof, and combinations thereof, and where n is zero or an integer from 1 to 4.

In some embodiments, an activator may be used with the catalyst. As used herein, the term "activator" refers to any compound or combination of compounds, supported or unsupported, which can activate a catalyst compound or component, such as by creating a cationic species of the catalyst component. Illustrative activators include, but are not limited to, aluminoxane (e.g. methylaluminoxane "MAO"), modified aluminoxane (e.g. modified methylaluminoxane "MMAO" and/or tetraisobutyldialuminoxane "TIBAO"), and alkylaluminum compounds, ionizing activators (neutral or ionic) such as tri (nbutyl)ammonium tetrakis(pentafluorophenyl)boron may be also be used, and combinations thereof.

The catalyst can include a support material or carrier. As used herein, the terms "support" and "carrier" are used interchangeably and are any support material, including a porous support material, for example, talc, inorganic oxides, and inorganic chlorides. The catalyst component(s) and/or activator(s) can be deposited on, contacted with, vaporized with, bonded to, or incorporated within, adsorbed or absorbed in, or on, one or more supports or carriers. Other support materials can include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof. Suitable catalyst supports can as discussed and described in, for example, Hlatky, Chem. Rev. (2000), 100, pp. 1347-1376 and Fink et al., Chem. Rev. (2000), 100, pp. 1377-1390, U.S. Pat. Nos. 4,701,432, 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,698,487; 5,714,424; 5,723,400; 5,723,402; 5,731,261; 5,759,940; 5,767,032; 5,770,664; and 5,972,510; and WO Publication Nos. WO 95/32995; WO 95/14044; WO 96/06187; WO 97/02297; WO 99/47598; WO 99/48605; and WO 99/50311.

Chromium Catalysts

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like. Other non-limiting examples of chromium catalysts are described in U.S. Pat. No. 6,989,344.

Group 15-Containing Catalyst

The "Group 15-containing catalyst" can include Group 3 to Group 12 metal complexes, where the metal is 2 to 8 coordinate, the coordinating moiety or moieties including at least two Group 15 atoms, and up to four Group 15 atoms. For example, the Group 15-containing catalyst component can be a complex of a Group 4 metal and from one to four ligands such that the Group 4 metal is at least 2 coordinate, the coordinating moiety or moieties including at least two nitrogens. Representative Group 15-containing compounds are disclosed in WO Publication No. WO 99/01460; European Publication Nos. EP 0893454A1 and EP 0894005A1; and U.S. Pat. Nos. 5,318,935; 5,889,128; 6,333,389; and 6,271,325.

A mixed catalyst can also be used to produce the linear polyethylene. The mixed catalyst can be a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multicatalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one example, the mixed catalyst includes at least one metallocene catalyst component and at least one non-metallocene component.

Gas Phase Polymerization

Generally, in a fluidized gas phase process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. Illustrative gas phase polymerization processes can be as discussed and described in U.S. Pat. Nos. 4,543,399; 4,588,790; 5,028,670; 5,317,036; 5,352,749; 5,405,922; 5,436,304; 5,453,471; 5,462,999; 5,616,661; and 5,668,228.

The reactor pressure in a gas phase process can vary from about 69 kPa to about 3,450 kPa, about 690 kPa to about 3,450 kPa, about 1,380 kPa to about 2,759 kPa, or about 1,724 kPa to about 2,414 kPa.

The reactor temperature in the gas phase process can vary from about 30° C. to about 120° C., preferably from about 60° C. to about 115° C., more preferably in the range of from about 70° C. to 110° C., and most preferably in the range of from about 70° C. to about 95° C. In another embodiment, when high density polyethylene is desired, the reactor temperature is typically between about 70° C. and about 105° C.

The productivity of the catalyst or catalyst system in a gas phase system is influenced by the partial pressure of the main monomer. The preferred mole percent of the main monomer, ethylene or propylene, preferably ethylene, is from about 25 mol % to about 90 mol % and the comonomer partial pressure is from about 138 kPa to about 5,000 kPa, preferably about 517 kPa to about 2,069 kPa, which are typical conditions in a gas phase polymerization process. Also, in some systems, the presence of comonomer can increase productivity.

In a preferred embodiment, the reactor can be capable of producing more than 227 kilograms polymer per hour (kg/hr) to about 90,900 kg/hr or higher, preferably greater than 455 kg/hr, more preferably greater than 4,540 kg/hr, even more preferably greater than 11,300 kg/hr, still more preferably greater than 15,900 kg/hr, still even more preferably greater than 22,700 kg/hr, and preferably greater than 29,000 kg/hr to greater than 45,500 kg/hr, and most preferably over 45,500 kg/hr.

The polymerization in a stirred bed can take place in one or two horizontal stirred vessels according to the polymerization mode. The reactors can be subdivided into individually gas-composition-controllable and/or polymerization-temperature-controllable polymerization compartments. With continuous catalyst injection, essentially at one end of the reactor, and powder removal at the other end, the residence time distribution approaches that of plug flow reactor. Preferably the fluorocarbon, if present, is introduced into the first stirred vessel.

Other gas phase processes contemplated by the processes discussed and described herein can include those described in U.S. Pat. Nos. 5,627,242; 5,665,818; and 5,677,375; European Patent Application Publication Nos. EP-A-0 794 200 and EP-A-0 802 202; and EP Patent No. EP-B-634 421.

In another preferred embodiment the catalyst system is in liquid, suspension, dispersion, and/or slurry form and can be introduced into the gas phase reactor into a resin particle lean zone. Introducing a liquid, suspension, dispersion, and/or slurry catalyst system into a fluidized bed polymerization into a particle lean zone can be as discussed and described in U.S. Pat. No. 5,693,727.

In some embodiments, the gas phase polymerization can operate in the absence of fluorocarbon. In some embodiments, the gas phase polymerization can be conducted in the presence of a fluorocarbon. Generally speaking the fluorocarbons can be used as polymerization media and/or as condensing agents.

Slurry Phase Polymerization

A slurry polymerization process generally operates at a pressure range between about 103 kPa to about 5,068 kPa or even greater and a temperature from about 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane medium having from about 3 to about 7 carbon atoms, preferably a branched alkane. The medium employed can be liquid under the conditions of polymerization and relatively inert. When a propane medium is used the process can be operated above the reaction diluent critical temperature and pressure. Preferably, a hexane or an isobutane medium is employed.

In one embodiment, a preferred polymerization technique, referred to as a particle form polymerization or a slurry process, can include maintaining the temperature below the temperature at which the polymer goes into solution. Such technique is well known in the art, and can be as discussed and described in U.S. Pat. No. 3,248,179. The preferred temperature in the particle form process can be from about 20° C. to about 110° C. Two preferred polymerization processes for the slurry process can include those employing a loop reactor and those utilizing a plurality of stirred reactors in series, parallel, or combinations thereof. Non-limiting examples of slurry processes include continuous loop or stirred tank processes. Also, other examples of slurry processes can be as discussed and described in U.S. Pat. No. 4,613,484.

In another embodiment, the slurry process can be carried out continuously in a loop reactor. The catalyst, as a slurry in mineral oil and/or paraffinic hydrocarbon or as a dry, free flowing powder, can be injected regularly to the reactor loop, which can be filled with a circulating slurry of growing polymer particles in a diluent containing monomer and comonomer. Hydrogen, optionally, can be added as a molecular weight control. The reactor can be operated at a pressure of about 3,620 kPa to about 4,309 kPa and at a temperature from about 60° C. to about 115° C. depending on the desired polymer melting characteristics. Reaction heat can be removed through the loop wall since much of the reactor is in the form of a double-jacketed pipe. The slurry is allowed to exit the reactor at regular intervals or continuously to a heated low pressure flash vessel, rotary dryer, and a nitrogen purge column in sequence for removal of the diluent and at least a portion of any unreacted monomer and/or comonomers. The resulting hydrocarbon free powder can be compounded for use in various applications.

The reactor used in the slurry process can produce greater than 907 kg/hr, more preferably greater than 2,268 kg/hr, and most preferably greater than 4,540 kg/hr polymer. In another embodiment, the slurry reactor can produce greater than 6,804 kg/hr, preferably greater than 11,340 kg/hr to about 45,500 kg/hr. The reactor used in the slurry process can be at a pressure from about 2,758 kPa to about 5,516 kPa, preferably about 3,103 kPa to about 4,827 kPa, more preferably from about 3,448 kPa to about 4,482 kPa, most preferably from about 3,620 kPa to about 4,309 kPa.

The concentration of the predominant monomer in the reactor liquid medium in the slurry process can be from about 1 wt % to about 30 wt %, preferably from about 2 wt % to about 15 wt %, more preferably from about 2.5 wt % to about 10 wt %, most preferably from about 3 wt % to about 20 wt %.

In one or more embodiments, the slurry and/or gas phase polymerization can be operated in the absence of, or essentially free of, any scavengers, such as triethylaluminum, trimethylaluminum, tri-isobutylaluminum and tri-n-hexylaluminum and diethyl aluminum chloride, dibutyl zinc and the like. Operation of the slurry and/or gas phase reactors in the absence of, or essentially free of, any scavengers can be as discussed and described in WO Publication No. WO 96/08520 and U.S. Pat. No. 5,712,352. In another embodiment the polymerization processes can be run with scavengers. Typical scavengers include trimethyl aluminum, triethyl aluminum, tri-isobutyl aluminum, tri-n-octyl aluminum, and an excess of alumoxane and/or modified alumoxane.

In some embodiments, the slurry phase polymerization can operate in the absence of a fluorocarbon. In some embodiments, the slurry phase polymerization can be conducted in the presence of a fluorocarbon. Generally speaking the fluorocarbons can be used as polymerization media.

Solution Phase Polymerization

As used herein, the phrase "solution phase polymerization" refers to a polymerization system where the polymer produced is soluble in the polymerization medium. Generally this involves polymerization in a continuous reactor in which the polymer formed and the starting monomer and catalyst materials supplied, are agitated to reduce or avoid concentration gradients and in which the monomer acts as a solution phase polymerization diluent or solvent or in which a hydrocarbon is used as a solution phase polymerization diluent or solvent. Suitable processes typically operate at temperatures from about 0° C. to about 250° C., preferably from about 10° C. to about 150° C., more preferably from about 40° C. to about 140° C., more preferably from about 50° C. to about 120° C. and at pressures of about 0.1 MPa or more, preferably 2 MPa or more. The upper pressure limit is not critically constrained but typically can be about 200 MPa or less, preferably, 120 MPa or less. Temperature control in the reactor can generally be obtained by balancing the heat of polymerization, and with reactor cooling by reactor jackets or cooling coils to cool the contents of the reactor, auto refrigeration, pre-chilled feeds, vaporization of liquid medium (diluent, monomers or solvent) or combinations thereof. Adiabatic reactors with pre-chilled feeds can also be used. The purity, type, and amount of solution phase polymerization solvent can be optimized for the maximum catalyst productivity for a particular type of polymerization. The solution phase polymerization solvent can be also introduced as a catalyst carrier. The solution phase polymerization solvent can be introduced as a gas phase or as a liquid phase depending on the pressure and temperature. Advantageously, the solution phase polymerization solvent can be kept in the liquid phase and introduced as a liquid. Solution phase polymerization solvent can be introduced in the feed to the polymerization reactors.

In a preferred embodiment, the polymerization process can be described as a continuous, non-batch process that, in its steady state operation, is exemplified by removal of amounts of polymer made per unit time, being substantially equal to the amount of polymer withdrawn from the reaction vessel per unit time. By "substantially equal" it is intended that these amounts, polymer made per unit time, and polymer withdrawn per unit time, are in ratios of one to other, of from 0.9:1; or 0.95:1; or 0.97:1; or 1:1. In such a reactor, there will be a substantially homogeneous monomer distribution.

Preferably in a continuous process, the mean residence time of the catalyst and polymer in the reactor generally can be from about 5 minutes to about 8 hours, and preferably from about 10 minutes to about 6 hours, more preferably from 10 minutes to 1 hour. In some embodiments, comonomer (such as ethylene) can be added to the reaction vessel in an amount to maintain a differential pressure in excess of the combined vapor pressure of the main monomer (such as propylene) and any optional diene monomers present.

In another embodiment, the polymerization process can be carried out at a pressure of ethylene of from about 68 kPa to about 6,800 kPa, most preferably from about 272 to about 5,440 kPa. The polymerization is generally conducted at a temperature of from about 25° C. to about 250° C., preferably from about 75° C. to about 200° C., and most preferably from about 95° C. to about 200° C.

The addition of a small amount of hydrocarbon to a typical solution phase process can cause the polymer solution viscosity to drop and/or the amount of polymer solute to increase. Addition of a larger amount of solution phase polymerization solvent in a traditional solution process can cause the separation of the polymer into a separate phase (which can be solid or liquid, depending on the reaction conditions, such as temperature or pressure).

The processes discussed and described herein can be carried out in continuous stirred tank reactors, batch reactors, or plug flow reactors. One reactor can be used even if sequential polymerizations are being performed, preferably as long as there is separation in time or space of the two reactions. Likewise, two or more reactors operating in series or parallel can also be used. These reactors can have or not have internal cooling and the monomer feed may or may not be refrigerated. See the general disclosure of U.S. Pat. No. 5,001,205 for general process conditions. See also, WO Publication Nos. WO 96/33227 and WO 97/22639.

As previously noted, the processes described above can optionally use more than one reactor. The use of a second reactor is especially useful in those embodiments in which an additional catalyst, especially a Ziegler-Natta or chrome catalyst, or by proper selection of process conditions, including catalyst selection, polymers with tailored properties can be produced. The cocatalysts and optional scavenger components in the process can be independently mixed with the catalyst component before introduction into the reactor, or they can each independently be fed into the reactor using separate streams, resulting in "in reactor" activation. Each of the above processes can be employed in single reactor, parallel or series reactor configurations. In series operation, the second reactor temperature is preferably higher than the first reactor temperature. In parallel reactor operation, the temperatures of the two reactors can be independent. The pressure can vary from about 0.1 kPa to about 250 MPa, preferably from about 0.01 MPa to about 160 MPa, most preferably from 0.1 MPa to about 50 MPa. The liquid processes can include contacting olefin monomers with any one or more of the catalyst systems discussed and described herein in a suitable polymerization diluent or solvent and allowing the monomers to react for a sufficient time to produce the desired polymers. In multiple reactor processes the polymerization solvent can be introduced into one or all of the reactors. In particular, a first polymerization solvent can be introduced into the first reactor, and a second polymerization solvent, which can be the same or different from the first polymerization solvent, can be introduced into the second reactor. Likewise the polymerization solvent can be introduced in the first reactor alone or the second reactor alone. In addition to the above, in multiple reactor configurations where there is a third, fourth or fifth reactor, the polymerization solvent can be introduced into all of the third, fourth and fifth reactors, none of the third, fourth and fifth reactors, just the third reactor, just the fourth reactor, just the fifth reactor, just the third and fourth reactors, just the third and fifth reactors, or just the fourth and fifth reactors. Likewise, any polymerization solvent introduced to any of the third, fourth, and/or fifth reactors can be the same or different as the first and/or second solvents.

In another embodiment, a sequential polymerization process is used and the first polymerization is a slurry process to produce a homopolymer followed by another slurry reactor for impact copolymer production. Impact copolymers can be produced by first making homopolypropylene in a slurry reactor, and transferring the homopolypropylene to another slurry reactor where copolymers are produced in the presence of the homopolypropylene.

In another embodiment, the two (or more) polymerizations can occur in the same reactor but in different reaction zones. For example, another preferred embodiment is process to prepare impact copolymers comprising producing a semi-crystalline polymer in a first reaction zone and then transferring the semi-crystalline polymer to a second reaction zone where a low crystallinity polymer is produced in the presence of the semi-crystalline polymer.

In any of the embodiments above, the first reactor and second reactor can be reaction zones in the same reactor. Reactors where multiple reaction zones are possible include Sp Herizone™ type reactors and those described in U.S. Pat. No. 6,413,477.

In a particular embodiment, the impact copolymer can be produced in situ within three reactors, where a first polypropylene is produced in a first reactor, a second polypropylene is produced in a second reactor, and the ethylene copolymer or elastomeric polymer is produced in a third reactor, with each reactor associated in series. In another particular embodiment, the impact copolymer can be produced in situ within three reactors, where the first polypropylene is produced in the first reactor with a first catalyst composition and the second polypropylene is produced in the second reactor with a second catalyst composition, where the first and second catalyst compositions differ from one another, and the elastomeric polymer is produced in the third reactor, each reactor associated in series.

In a particular embodiment, the first and second reactors can be slurry-loop reactors and the third reactor can be a gas phase reactor. The first and second reactors can produce the polypropylenes, homopolymers in a particular embodiment, and the gas phase reactor can produce the ethylene copolymer or elastomeric polymer, thus creating an in situ blend of the ethylene copolymer in the polypropylene matrix. The impact copolymer can include from a low of about 30 wt %, about 35 wt %, or about 40 wt % to a high of about 60 wt %, about 65 wt %, or about 70 wt % of the first polypropylene, based on the total weight of the impact copolymer. The impact copolymer can also include from a low of about 10 wt %, about 15 wt %, or about 20 wt % to a high of about 30 wt %, about 35 wt %, or about 40 wt % of the second polypropylene, based on the total weight of the impact copolymer. The impact copolymer can also include from a low of about 15 wt %, about 20 wt %, or about 22 wt % to a high of about 26 wt %, about 30 wt %, or about 35 wt % of the ethylene copolymer, based on the total weight of the impact copolymer. These amounts can be achieved, in the case where one or more reactors is used to produce the propylene impact copolymer, by any suitable means known to those skilled in the art including control of the residence time in each stage and/or reactor, the amount and/or particular catalyst composition(s), variation in the reactants in each stage and/or reactor (i.e., propylene, comonomer, hydrogen, etc. concentrations), combinations of these, and/or any other means.

The catalyst composition can be modified by changing the identity and/or amount of the transition metal component or the electron donors and/or co-catalysts used in conjunction with the transition metal component. A desirable catalyst composition arrangement can be as discussed and described in WO Publication No. WO 99/20663A2, where sequential electron donors are used to modify the catalyst composition from one reactor to another, the sequential donors being different compounds or mixtures of compounds. For example, a titanium-magnesium based Ziegler-Natta catalyst can be used in all of the reactors, the same titanium-magnesium composition in a particular embodiment, but the aluminum-alkoxy/alkyl "electron donor" compound used in the first reactor can be different than the aluminum-alkoxy/alkyl compound used in the second reactor. Alternatively, the ratio of a mixture of aluminum-alkoxy/alkyl compounds can be changed in going from the first to the second reactor. In this manner, the isotacticity and/or MFR of the first and second polypropylenes can be tailored.

In embodiments where one or more reactors are used to produce the impact copolymer(s), one or more chain terminating agent(s) (e.g., hydrogen) can be used to control the MFR (molecular weight) of the polypropylene(s). The chain terminating agents can be used as a means of adjusting the MFR of components of the impact copolymer either alone or in conjunction with other means. In a particular embodiment, the process of producing the impact copolymer can include contacting a catalyst with propylene, a first amount of a chain terminating agent, and optionally one or more comonomers, e.g., ethylene and/or $C_4$ to $C_{12}$ α-olefins, in a first reactor to form a first polypropylene comprising no more than 5 wt % of ethylene and/or α-olefin derived units, based on the weight of the first polypropylene. The catalyst and the first polypropylene can be contacted with propylene, a second amount of a chain terminating agent, and optionally one or more comonomers, e.g., ethylene and/or $C_4$ to $C_{12}$ α-olefins in a second reactor to form a second polypropylene comprising no more than 5 wt % of ethylene and/or α-olefin derived units, based on the weight of the second polypropylene. The second amount of chain terminating agent can be greater than the first amount of chain terminating agent. Finally, the catalyst composition, the first polypropylene, and the second polypropylene can be contacted with propylene and ethylene in a third reactor to form an ethylene-propylene copolymer that includes from about 35 wt % or about 40 wt % or about 45 wt % to about 60 wt % or about 65 wt %, or about 70 wt % ethylene-derived units, based on the weight of the impact copolymer.

The first amount of the chain terminating agent can be added to the one or more reactors and/or one or more stages within the reactor(s) such that the first polypropylene has an $MFR_1$ from a low of about 8 dg/min, about 15 dg/min, or about 18 dg/min to a high of about 33 dg/min, about 35 dg/min, or about 40 dg/min. The second amount of chain terminating agent can be added (in certain embodiments) such that the second polypropylene has an $MFR_2$ from a low of about 50 dg/min, about 65 dg/min, or about 70 dg/min to a high of about 100 dg/min, about 120 dg/min, or about 190 dg/min. Described another way, the second amount of chain terminating agent (in certain embodiments) can be greater than the first amount of chain terminating agent such that the $MFR_1$ of the first polypropylene is at least 30% less, at least 35% less, at least 40% less, at least 45% less, or at least 50% less than the $MFR_2$ of the second polypropylene. Stated in yet another way, the chain terminating agent(s) can be added to the reactor(s) such that $MFR_2/MFR_1$ is from a low of about 2, about 2.5, or about 3 to a high of about 4, about 4.5, about 5, or about 6 in certain embodiments, and greater than 1.5, greater than 2.0, greater than 2.5, or greater than 3 in other embodiments. The amount of chain terminating agent can be varied by any suitable means in the reactor(s), and in one embodiment the amount of the first chain terminating agent can be less than 2,000 mol ppm or less than 1,800 mol ppm as measured in the first propylene feed to the reactor, and the amount of the second chain terminating agent can be greater than 2,500 mol ppm or greater than 2,800 mol ppm as measured in the second propylene feed to the reactor.

In certain embodiments of the three reactor process, catalyst components, propylene, chain terminating agent, and any other optional monomers can be fed to a first loop reactor for a first homopolymerization or copolymerization process. The high heat removal capability of the loop reactor can cause or facilitate turbulent mixing of the slurry and the large surface-to-volume ratio of the reactor can enable high specific outputs. Operating conditions are typically in the range of about 60° C. to about 80° C., about 500 psi to about 700 psi, and an amount of chain terminating agent, hydrogen in a preferred embodiment, of less than about 2,000 mol ppm or less than about 1,800 mol ppm as measured in the propylene feed to the reactor, and within the range from about 1,000 mol ppm, about 1,100 mol ppm, or about 1,200 mol ppm to about 1,800 mol ppm, or about 2,000 mol ppm in another embodiment. The polymer produced from the first reactor (along with residual chain terminating agent and monomers) can be transferred to a second loop reactor where the operating conditions can be the same or different with respect to the first loop reactor. Additional monomer, chain terminating agent, and optional comonomer can also be added. In a particular embodiment, at least the amount of the second chain terminating agent will be different, where the amount of chain terminating agent, hydrogen in a preferred embodiment, is greater than 2,500 mol ppm or greater than 2,800 mol ppm as measured in the propylene feed to the second reactor, and within the range of about 2,500 mol ppm, about 3,000 mol ppm, or about 3,400 mol ppm to about 3,600 mol ppm, or about 4,000 mol ppm in another embodiment.

Upon exiting the second loop reactor, the polypropylene slurry can be depressurized and flashed at a pressure that allows for recycle of the vaporized monomer(s) by condensation using cooling water or other cooling means, and can be sufficient for gas phase polymerization. The polypropylene and catalyst composition mixture can be transferred to a gas phase reactor. The ethylene copolymer or elastomeric polymer can be produced within this gas phase reactor in certain embodiments. The ethylene copolymer, an ethylene-propylene copolymer in a preferred embodiment, can be produced in a particular embodiment by use of a fluidized bed gas phase reactor operating at a temperature from a low of about 50° C., about 60° C., or about 70° C. to a high of about 80° C., about 90° C., about 100° C., about 110° C., or about 120° C., and pressures from a low of about 100 psi, about 125 psi, or about 150 psi to a high of about 200 psi, about 250 psi, or about 300 psi. Polymer exiting the polymerization section can pass through a low pressure separator, in which the remaining monomer can be separated for recycle. A steam treatment vessel for deactivation of the residual catalyst can present in certain embodiments. A small fluid bed dryer or other drying means can also be present. An example of such a process can include the so called "Spheripol" reactor process.

The catalyst composition can be any suitable catalyst composition known for polymerizing olefins to produce polyolefins and is desirably a composition that can control the isotacticity of the polymers that are produced. Non-limiting examples of suitable catalysts compositions include Ziegler-Natta catalysts, metallocene catalysts, chromium catalysts, metal-imide/amine coordination catalysts, and combinations of such catalysts, each with its desirable co-catalyst and/or electron donor or other modifying agent known in the art. An example of certain desirable catalyst compositions can be as discussed and described in WO Publication No. WO 99/20663, e.g., a Ziegler-Natta catalyst composition using any one of a combination of aluminum alkyl donor systems. The selection of other conditions for producing the individual impact copolymer components and the whole propylene impact copolymer is reviewed by, for example, G. DiDrusco and R. Rinaldi in "Polypropylene-Process Selection Criteria" in HYDROCARBON PROCESSING 113 (November 1984), and references cited therein.

In a preferred embodiment, a sequential polymerization process can be used and the first polymerization can be a slurry process to produce homopolymer followed by a gas phase process for producing the impact copolymer. The slurry process can be a loop reactor or a CSTR type of reactor. In a loop reactor, the first reaction stage can include one or two tubular loop reactors where bulk polymerization of homopolymers can be carried out in liquid propylene. The catalyst, e.g., a prepolymerized catalyst, and liquid propylene, and hydrogen for controlling molecular weight can be fed into the reactor. The homopolymer in liquid propylene inside the loops can be continuously discharged to a separation unit. Unreacted propylene can be recycled to the reaction medium while the polymer can be transferred to one or two gas phase reactors where ethylene, propylene, and hydrogen can be added to produce the impact copolymers. The granules can be discharged to the monomer flashing and recovery section and sent to a monomer stripping system. After the drying unit, the granular resin can be conveyed to an extrusion system for stabilization, and pelletization.

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

As used herein, Mn is number average molecular weight, Mw is weight average molecular weight, and Mz is z average molecular weight as determined by GPC-SEC as described below, wt % is weight percent, and mol % is mole percent. Molecular weight distribution (MWD) is defined to be Mw divided by Mn. Unless otherwise noted, all molecular weight units, e.g., Mw, Mn, Mz, are g/mol.

The following abbreviations may be used throughout this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is tri-isobutylaluminum, TNOAL is triisobutyl n octylaluminum, MAO is methylalumoxane, pMe is para-methyl, Ar* is 2,6-diisopropylaryl, Bz is benzyl, THF is tetrahydrofuran, RT is room temperature which is defined as 25° C. unless otherwise specified, and tol is toluene.

The term "phr" is parts per hundred rubber or "parts", and is a measure common in the art where components of a composition are measured by weight, relative to a total weight of all of the elastomer components. The total phr or parts for all rubber components, whether one, two, three, or more different rubber components is present in a given recipe is always defined as 100 phr. All other non-rubber components are ratioed by weight against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s).

End Use Compositions

In some embodiments the impact copolymer can be blended with up to 25 wt % (preferably up to 20 wt %, preferably up to 15 wt %, preferably up to 10 wt %, preferably up to 5 wt %), based upon the weight of the composition, of one or more additional polymeric additives (preferably the impact copolymer is blended with greater than 0.5 to 25 wt %, preferably 0.75 to 20 wt %, preferably 1 to 15 wt %, preferably 1.5 to 10 wt %, preferably 2 to 5 wt %, based upon the weight of the composition, of one or more additional polymeric additives). Suitable polymers useful as polymeric additives can include, but are not limited to, polyethylenes, including, but not limited to, copolymers of ethylene and one or more polar monomers, preferably selected from vinyl acetate, methyl acrylate, n-butyl acrylate, acrylic acid, and vinyl alcohol (i.e., EVA, EMA, EnBA, EAA, and EVOH); ethylene homopolymers and copolymers synthesized using a high-pressure free radical process, including LDPE; copolymers of ethylene and $C_3$ to $C_{40}$ olefins (preferably propylene and/or butene) with a density of greater than 0.91 g/cm$^3$ to less than 0.94 g/cm$^3$), including LLDPE; and high density PE (0.94 g/cm$^3$ to 0.98 g/cm$^3$). Suitable polymers can also include, but are not limited to, polybutene-1 and copolymers of polybutene-1 with ethylene and/or propylene. Suitable polymers can also include, but are not limited to, non-EP Rubber Elastomers. Non-EP Rubber Elastomers can include, but are not limited to, Polyisobutylene, butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (both cis and trans). Other suitable polymers can include low-crystallinity propylene/olefin copolymers, preferably random copolymers. The low-crystallinity or random copolymer can have at least 70 wt % propylene and 5 wt % to 30 wt % (preferably 5 wt % to 20 wt %) of comonomer selected from ethylene, butene, and hexene; preferably ethylene). The polymers can be made via a metallocene-type catalyst; and having one or more of the following properties: a) $M_w$ of 20 kg/mol to 5,000 kg/mol (preferably 30 kg/mol to 2,000 kg/mol, preferably 40 kg/mol to 1,000 kg/mol, preferably 50 kg/mol to 500 kg/mol, preferably 60 kg/mol to 400 kg/mol); and/or b) molecular weight distribution index ($M_w/M_n$) of 1.5 to 10 (preferably 1.7 to 5, preferably 1.8 to 3); and/or c) branching index (g') of 0.9 or greater (preferably 0.95 or greater, preferably 0.99 or greater); and/or d) density of 0.85 to about 0.90 g/cm$^3$ (preferably 0.855 g/cm$^3$ to 0.89 g/cm$^3$, preferably 0.86 g/cm$^3$ to about 0.88 g/cm$^3$); and/or e) melt flow rate (MFR) of at least 0.2 dg/min (preferably 1-500 dg/min, preferably 2-300 dg/min); and/or f) heat of fusion ($H_f$) of 0.5 J/g or more (preferably 1 J/g or more, preferably 2.5 J/g or more, preferably 5 J/g or more) but less than or equal to 75 J/g (preferably less than or equal to 50 J/g, preferably less than or equal to 35 J/g, preferably less than or equal to 25 J/g); and/or g) DSC-determined crystallinity of from 1 wt % to 30 wt % (preferably 2 wt % to 25 wt %, preferably 2 wt % to 20 wt %, preferably 3 wt % to 15 wt %); and/or h) a single broad melting transition with a peak melting point of 25° C. to about 105° C. (preferably 25° C. to 85° C., preferably 30° C. to 70° C., preferably 30° C. to 60° C.), where the highest peak is considered the melting point; and/or a crystallization temperature ($T_c$) of 90° C. or less (preferably 60° C. or less); and/or j) greater than 80% of the propylene residues (exclusive of any other monomer such as ethylene) arranged as 1,2 insertions with the same stereochemical orientation of the pendant methyl groups, either meso or racemic, as determined by $^{13}$C NMR; and/or k) $^{13}$C NMR-determined propylene tacticity index of more than 1; and/or l) $^{13}$C NMR-determined mm triad tacticity index of 75% or greater (preferably 80% or greater, preferably 82% or greater, preferably 85% or greater, preferably 90% or greater). Useful low-crystallinity propylene/olefin copolymers are available from ExxonMobil Chemical; suitable examples include Vistamaxx™ 6100, Vistamaxx™ 6200 and Vistamaxx™ 3000. Other useful low crystallinity propylene/olefin copolymers are described in WO Publication Nos. WO 03/040095, WO 03/040201, WO 03/040233, and WO 03/040442, all to Dow Chemical, which disclose propylene-ethylene copolymers made with non-metallocene catalyst compounds. Still other useful low-crystallinity propylene/olefin copolymers are described in U.S. Pat. No. 5,504,172 to Mitsui Petrochemical. Preferred low-crystallinity propylene/olefin copolymers are described in U.S. Patent Application Publication No. 2002/0004575 to ExxonMobil Chemical. Other suitable polymers can include propylene oligomers suitable for adhesive applications, such as those described in WO Publication No. WO 2004/046214, particular those at pages 8 to 23. Still other suitable polymers can include Olefin block copolymers, including those described in WO Publication Nos. WO 2005/090425, WO 2005/090426, and WO 2005/090427. Other suitable polymers can include polyolefins that have been post-reactor functionalized with maleic anhydride (so-called maleated polyolefins), including maleated ethylene polymers, maleated EP Rubbers, and maleated propylene polymers. Preferably, the amount of free acid groups present in the maleated polyolefin is less than about 1,000 ppm (preferably less than about 500 ppm, preferably less than about 100 ppm), and the amount of phosphite present in the maleated polyolefin is less than 100 ppm. Other suitable polymers can include Styrenic Block Copolymers (SBCs), including (but not limited to): Unhydrogenated SBCs such as SI, SIS, SB, SBS, SIBS and the like, where S=styrene, I=isobutylene, and B=butadiene; and hydrogenated SBCs, such as SEBS, where EB=ethylene/butene. Other suitable polymers can include Engineering Thermoplastics, including (but not limited to):

Polycarbonates, such as poly(bisphenol-a carbonate); polyamide resins, such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, and nylon 66/PPS copolymer; polyester resins, such as polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer, and other aromatic polyesters; nitrile resins, such as polyacrylonitrile (PAN), polymethacrylonitrile, styrene-acrylonitrile copolymers (SAN), methacrylonitrile-styrene copolymers, and methacrylonitrile-styrene-butadiene copolymers; acrylate resins, such as polymethyl methacrylate and polyethylacrylate; polyvinyl acetate (PVAc); polyvinyl alcohol (PVA); chloride resins, such as polyvinylidene chloride (PVDC), and polyvinyl chloride (PVC); fluoride resins, such as polyvinylidene fluoride (PVDF), polyvinyl fluoride (PVF), polychlorofluoroethylene (PCFE), and polytetrafluoroethylene (PTFE); cellulose resins, such as cellulose acetate and cellulose acetate butyrate; polyimide resins, including aromatic polyimides; polysulfones; polyacetals; polylactones; polyketones, including aromatic polyketones; polyphenylene oxide; polyphenylene sulfide; styrene resins, including polystyrene, styrene-maleic anhydride copolymers, and acrylonitrile-butadienestyrene resin.

In a preferred embodiment, impact copolymer can include no added polymeric additives, or if present the polymeric additives can be present at 0.5 wt % or less.

In a particularly preferred embodiment, the impact copolymer can include less than 10 wt % LLDPE having a density of 0.912 g/cm$^3$ to 0.935 g/cm$^3$ (preferably less than 5 wt %, preferably less than 1 wt %, preferably 0 wt %), based upon the weight of the composition.

The propylene impact copolymer can be formed by any suitable means into articles of manufacture such as automotive components, pallets, crates, cartons, appliance components, sports equipment and other articles that would benefit from high impact resistance. In a particular embodiment, the propylene impact copolymers can be formed into pallets, and can be injection molded into pallets in a particular embodiment. The impact copolymers can include from 200 ppm to 1,500 ppm of a nucleating agent. The presence of nucleating agents can benefit the impact copolymers by reducing the crystallization rate and hence improve the cycle time (injection, packing, cooling and part ejection) in the injection molding process. In such embodiments, the propylene impact copolymers possess a crystallization half-time at 135° C. can be less than 15 or less than 12 or less than 10 or less than 5 or less than 2 minutes, or less than 60 or less than 40 seconds. The cycle time for injection molding can be improved in certain embodiments such that the cycle time is less than 80 seconds, less than 70 seconds, or less than 60 seconds.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

A series of impact copolymers with varying concentrations of hexane during polymerization were prepared. The impact copolymers (Examples 1-7) were prepared according to the following procedure. In a slurry phase stainless steel reactor 2 mL of a 5 wt % solution of catalyst donor (approximately 5 wt % dicyclopentydimethoxysilane and 95 wt % n-propyltriethoxysilane) in hexane and about 2 mL of triethyl aluminum (TEAL) were added at room temperature and atmospheric pressure (0.10 MPa). Thereafter, a charge of 1.82 MPa to 2.51 MPa of hydrogen was introduced into the reactor (range of hydrogen is based on desired set point). A magnesium chloride supported titanium Ziegler-Natta catalyst, which was a THC-C type catalyst solid system from Toho Titanium Corporation of Japan, was used for these experiments.

For all examples, 250 mL of a 5 wt % solution of magnesium chloride supported titanium Ziegler-Natta catalyst in mineral oil was charged through a catalyst tube with 1,000 mL of propylene into the reactor. A stirrer was used to keep the reaction mixture well mixed at 300-400 rpm, and the reaction was allowed to proceed for 5 minutes at room temperature. The reactor was heated to 70° C. and the pressure was allowed to build to a range of 3.48 MPa to 3.67 MPa. The reaction was allowed to proceed for 25 minutes.

The reaction mass was transferred to a 2 liter stainless steel gas phase reactor. The reaction mass consisted of polypropylene homopolymer particles, unreacted propylene and Ziegler-Natta catalyst. The reactor's stirrer was also started at this point to keep the reaction mixture well mixed at 400-450 rpm. The pressure was allowed to build to 1.48 MPa at room temperature, and the reactor was heated to 70° C. After reaching temperature, a 0.38 MPa to 0.65 MPa charge of hydrogen was introduced to the reactor through tubing (range of hydrogen is based on desired set point). Thereafter, the various amounts of hexane (as reported in Table 1 below) were charged into the reactor through a catalyst tube using a charge of ethylene as the carrier fluid. Ethylene was then charged into the reactor until the pressure reached 1.96 MPa through this same tubing. Ethylene was added throughout the reaction to maintain a pressure of 1.96 MPa. Propylene was added throughout the run as needed through a pump to maintain the desired ethylene mol % gas phase composition. The reaction was allowed to run for 30 minutes; and quenched by lowering the reactor heat, blocking away the feeds, and de-pressuring the reactor. The end product from this reaction was the impact copolymer. The impact copolymer was a porous polypropylene homopolymer with ethylene-propylene random copolymer filling the pores of the homopolymer particles. The comparative examples (C1 and C2) were made the same way, but no hexane was used.

At each hexane level (amount), the gas phase reactor ethylene content was varied to evaluate the effect on the EP rubber content of the final ICP. Table 1 below also summarizes these results. FIG. 1 also shows the effect hexane has on the ethylenepropylene content (wt %) during the production of impact copolymers by gas-phase polymerization.

TABLE 1

| Example | Hexane Amount (mL) | Slurry Phase Reactor Hydrogen (mol %) | Gas Phase Reactor Ethylene (mol fraction) | Gas Phase Reactor Hydrogen (mol %) | EP Rubber (wt %) |
| --- | --- | --- | --- | --- | --- |
| C1 | 0 | 5.8 | 0.46 | 1.9 | 22.3 |
| C2 | 0 | 4.6 | 0.72 | 1.8 | 26.7 |
| Ex. 1 | 4 | 6.4 | 0.31 | 2.1 | 28.5 |
| Ex. 2 | 4 | 5.4 | 0.41 | 1.8 | 30.1 |
| Ex. 3 | 8 | 6.4 | 0.27 | 2.1 | 24.3 |
| Ex. 4 | 8 | 6.6 | 0.39 | 1.5 | 34.3 |
| Ex. 5 | 16 | 6.3 | 0.32 | 1.8 | 26.6 |

TABLE 1-continued

| Example | Hexane Amount (mL) | Slurry Phase Reactor Hydrogen (mol %) | Gas Phase Reactor Ethylene (mol fraction) | Gas Phase Reactor Hydrogen (mol %) | EP Rubber (wt %) |
|---|---|---|---|---|---|
| Ex. 6 | 16 | 6.4 | 0.52 | 2.6 | 36.1 |
| Ex. 7 | 32 | 7.9 | 0.51 | 2.1 | 25.4 |

As shown in Table 1, the addition of hexane was beneficial in increasing the amount of EP rubber in the impact copolymer up to approximately 16 mL of hexane. At some point between 16 mL and 32 mL of hexane addition to the gas phase reactor (GPR), the EP rubber content did not increase significantly from the comparative examples C1 and C2 in which no hexane was added. From the graph depicted in FIG. 1, there is a clear difference between the runs with the inert solvent and without the inert solvent.

The powder flow time of the impact copolymer particles gives an indication of the amount of rubber deposited on the surface of the particles relative to control samples. Accordingly, an additional test was conducted to compare the particle or powder flow times of impact polypropylene particles that had no hexane addition versus hexane addition. As depicted in FIG. 2, particles introduced to 16 mL of hexane exhibited comparable powder flow times as particles without the hexane addition.

It was surprising and unexpected that an inert solvent should be added to the gas phase reactor, as this step was expected to foul the reactor or lead to undesired processability issues because any amount of inert solvent that exceeds the total pore volume of the impact copolymer would be expected to coat the exterior of the impact copolymer particles, ultimately making the particles difficult to process commercially. Likewise, excess hexane would have been expected to cause polymerization of ethylene and propylene on the reactor walls and stirrer, leading to reactor fouling and unwanted cut-backs in rates.

In a second experiment, about 15 grams of isotactic polypropylene (iPP) granules made in an iPP polymerization reactor using a supported catalyst were introduced into several capped bottles sized so that they filled the bottom third of the bottle. The bottles were weighed before and after the addition of the iPP granules. To these bottles were then added aliquots of a light hydrocarbon oil consisting of a polydecene (polymerized by a cationic polymerization process and then exhaustively hydrogenated) having a viscosity of 3 cst at room temperature. The amount of process oil added in each example are shown in Tables 2A and 2B for iPP made with supported Ziegler-Natta catalyst and a supported metallocene catalysts, respectively, and are shown as the weight percent of the contained iPP granules for each bottle. At the end of the addition the bottles were vigorously agitated with the cap on securely for 5 minutes and then the flow of the powder granules was observed by turning the bottles upside down.

TABLE 2A

Addition of Hydrocarbon fluid to ZN iPP granules

| wt % of hydrocarbon fluid in granule | Free flowing | Adhering to walls |
|---|---|---|
| 0 | yes | no |
| 14.3 | yes | no |
| 16.2 | yes | no |
| 16.5 | yes | no |
| 18.4 | yes | no |

TABLE 2A-continued

Addition of Hydrocarbon fluid to ZN iPP granules

| wt % of hydrocarbon fluid in granule | Free flowing | Adhering to walls |
|---|---|---|
| 18.9 | yes | no |
| 19.4 | yes | no |
| 20.7 | yes | no |
| 22.4 | partly | partly |
| 22.8 | no | yes |
| 26.7 | no | yes |

TABLE 2B

Addition of Hydrocarbon fluid to metallocene iPP granules

| wt % of hydrocarbon fluid in granule | Free flowing | Adhering to walls |
|---|---|---|
| 0 | yes | no |
| 6.2 | yes | no |
| 7.3 | partly | partly |
| 8.5 | no | yes |
| 9.2 | no | yes |
| 10.6 | no | yes |
| 10.9 | no | yes |
| 11.8 | no | yes |
| 14.6 | no | yes |
| 17.8 | no | yes |
| 19.5 | no | yes |

As shown in Table 2A, the samples made with the ZN catalyst ceased to be free flowing and started to adhere to the walls of the containers at about 22.4 wt % of the hydrocarbon fluid in the iPP granules. Lesser amounts of hydrocarbon fluid were absorbed into the granules leaving a free flowing, non-adhering powder, while at larger amounts the powder clumped and adhered to the walls. As shown in Table 2B, the samples made with the metallocene catalyst ceased to be free flowing and started to adhere to the walls of the containers at about 7.3 wt % of the hydrocarbon fluid in the iPP granules.

Experimental Test Methods

All molecular weights are number average in g/mol unless otherwise noted. Unless otherwise noted, physical and chemical properties described herein are measured using the following test methods.

| | Test Procedures |
|---|---|
| Melt Index (MI) | ASTM D 1238 (190° C./2.16 kg) |
| Melt Flow Rate (MFR) | ASTM D 1238 (230° C./2.16 kg) |
| Mooney Viscosity | ASTM D 1646 |
| Density | ASTM D 1505 |
| Glass Transition Temperature ($T_g$) | DMA (see below) |
| Melting Temperature ($T_m$) | DSC (see below) |
| Crystallization Temperature ($T_c$) | DSC (see below) |
| Heat of Fusion ($H_f$) | DSC (see below) |
| % Crystallinity | DSC (see below) |
| $M_n, M_w, M_z,$ and $M_w/M_n$ | SEC (see below) |
| Branching Index (g') | SEC (see below) |
| Composition Distribution Breadth Index (CDBI) | See below |
| Intrinsic Viscosity | ASTM D 1601 (135° C. in decalin) |
| Injection Molding | ASTM D 4101 |
| Test Specimen Conditioning | ASTM D 618, Procedure A |
| Tensile Properties (e.g., Young's modulus, yield stress & strain, break stress & strain) | ASTM D 638 (Type I bar, 5 cm/min) |
| 1% Secant Flexural Modulus | ASTM D 790 (A, 1.3 mm/min) |
| Heat Deflection Temperature | ASTM D 648 (0.45 MPa) |
| Vicat Softening Temperature | ASTM D 1525 (200 g) |

-continued

| Test Procedures | |
|---|---|
| Gardner Impact Strength | ASTM D 5420 (GC) |
| Notched Izod Impact Strength | ASTM D 256 (Method A, or Method E if "reverse notch" noted) |
| Notched Charpy Impact Strength | ASTM D 6110 |
| Multi-Axial Impact Strength | ASTM D 3763 (15 MPH) |
| Shore (Durometer) Hardness | ASTM D 2240 (A or D, 15 sec delay) |
| Shrinkage upon injection molding | ISO 2577 |
| Powder Flow Time | ASTM D 1895-96 |
| Polypropylene tacticity | $^{13}$C NMR (see below) |
| Olefin content in ethylene or propylene copolymers | $^{13}$C NMR (see below) |
| Ethylene content of EP Rubbers | ASTM D 3900 |

Dynamic Mechanical Analysis (DMA)

The glass transition temperature (Tg) is measured using dynamic mechanical analysis. This test provides information about the small-strain mechanical response of a sample as a function of temperature over a temperature range that includes the glass transition region and the visco-elastic region prior to melting. Specimens are tested using a commercially available DMA instrument (e.g., TA Instruments DMA 2980 or Rheometrics RSA) equipped with a dual cantilever test fixture. The specimen is cooled to −130° C. then heated to 60° C. at a heating rate of 2° C./min while subjecting to an oscillatory deformation at 0.1% strain and a frequency of 1 rad/sec. The output of these DMA experiments is the storage modulus (E') and loss modulus (E"). The storage modulus measures the elastic response or the ability of the material to store energy, and the loss modulus measures the viscous response or the ability of the material to dissipate energy. The ratio of E"/E', called Tan-delta, gives a measure of the damping ability of the material; peaks in Tan-delta are associated with relaxation modes for the material. $T_g$ is defined to be the peak temperature associated with the β-relaxation mode, which typically occurs in a temperature range of −80 to +20° C. for polyolefins. In a hetero-phase blend, separate β-relaxation modes for each blend component can cause more than one $T_g$ to be detected for the blend; assignment of the $T_g$ for each component are preferably based on the $T_g$ observed when the individual components are similarly analyzed by DMA (although slight temperature shifts are possible).

Differential Scanning Calorimetry (DSC)

Crystallization temperature ($T_c$) and melting temperature (or melting point, $T_m$) are measured using Differential Scanning Calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Melting data (first heat) is acquired by heating the sample to at least 30° C. above its melting temperature, typically 220° C. for polypropylene, at a heating rate of 10° C./min. The sample is held for at least 5 minutes at this temperature to destroy its thermal history. Crystallization data are acquired by cooling the sample from the melt to at least 50° C. below the crystallization temperature, typically −50° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified.

For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Size-Exclusion Chromatography (SEC)

Molecular weight (weight-average molecular weight, $M_w$, number-average molecular weight, $M_n$, and molecular weight distribution, $M_w/M_n$ or MWD) are determined using a commercial High Temperature Size Exclusion Chromatograph (e.g., from Waters Corporation or Polymer Laboratories) equipped with three in-line detectors: a differential refractive index detector (DRI), a light scattering (LS) detector, and a viscometer.

The following approach is used for polyolefins. Details not described, including detector calibration, can be found in *Macromolecules* 34, pp. 6812-6820 (2001). Column set: 3 Polymer Laboratories PLgel 10 mm Mixed-B columns; Flow rate: 0.5 mL/min; Injection volume: 300 μL; Solvent: 1,2,4-trichlorobenzene (TCB), containing 6 g of butylated hydroxy toluene dissolved in 4 liters of Aldrich reagent grade TCB.

The various transfer lines, columns, DRI detector and viscometer are contained in an oven maintained at 135° C. The TCB solvent is filtered through a 0.7 μm glass pre-filter and subsequently through a 0.1 μm Teflon filter, then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. Injection concentration range from 1.0 to 2.0 mg/mL, with lower concentrations being used for higher molecular weight samples. Prior to running a set of samples, the DRI detector and injector are purged, the flow rate increased to 0.5 mL/min, and the DRI allowed to stabilize for 8-9 hours; the LS laser is turned on 1 hr before running samples.

The concentration, c, at each point in the chromatogram is calculated from the baseline-subtracted DRI signal, IDRI, using the following equation:

$$c = K_{DRI} I_{DRI}/(dn/dc)$$

where KDRI is a constant determined by calibrating the DRI, and (dn/dc) is the same as described below for the light scattering (LS) analysis. Units on parameters throughout this description are such that concentration is expressed in g/mL, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

where $\Delta R(\theta)$ is the measured excess Rayleigh scattering intensity at scattering angle $\theta$, c is the polymer concentration determined from the DRI analysis, $A_2$ is the second virial coefficient ($A_2$=0.0006 for propylene polymers and 0.001 otherwise), M is molecular weight, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 135° C. and $\lambda$=690 nm. (dn/dc)=0.104 for propylene polymers and 0.1 otherwise.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$ for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index (g') is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromotographic slices, i, between the integration limits. The branching index g' is defined as:

$$g' = \frac{[\eta]_{avg}}{k M_V^\alpha}$$

where, $\alpha$=0.695 for ethylene, propylene, and butene polymers; and k=0.000579 for ethylene polymers, k=0.000262 for propylene polymers, and k=0.000181 for butene polymers. $M_v$ is the viscosity-average molecular weight based on molecular weights determined by LS analysis.

Composition Distribution Breadth Index (CDBI)

CDBI is a measure of the composition distribution of monomer within the polymer chains. It is measured as described in WO Publication No. WO 93/03093, with the modification that any fractions having a weight-average molecular weight ($M_w$) below 20,000 g/mol are ignored in the calculation.

$^{13}$C NMR Spectroscopy on Polyolefins

Polypropylene microstructure is determined by $^{13}$C NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in d$_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in POLYMER CONFORMATION AND CONFIGURATION (Academic Press, New York 1969) and J. Randall in POLYMER SEQUENCE DETERMINATION, $^{13}$C NMR METHOD (Academic Press, New York, 1977).

The "propylene tacticity index", expressed herein as [m/r], is calculated as defined in H. N. Cheng, Macromolecules, 17, p. 1950 (1984). When [m/r] is 0 to less than 1.0, the polymer is generally described as syndiotactic, when [m/r] is 1.0 the polymer is atactic, and when [m/r] is greater than 1.0 the polymer is generally described as isotactic.

The "mm triad tacticity index" of a polymer is a measure of the relative isotacticity of a sequence of three adjacent propylene units connected in a head-to-tail configuration. More specifically, the mm triad tacticity index (also referred to as the "mm Fraction") of a polypropylene homopolymer or copolymer is expressed as the ratio of the number of units of meso tacticity to all of the propylene triads in the copolymer:

$$mmFraction = \frac{PPP(\text{mm})}{PPP(\text{mm}) + PPP(\text{mr}) + PPP(\text{rr})}$$

where PPP(mm), PPP(mr) and PPP(rr) denote peak areas derived from the methyl groups of the second units in the possible triad configurations for three head-to-tail propylene units, shown below in Fischer projection diagrams:

PPP(mm):

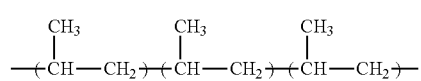

PPP(mr):

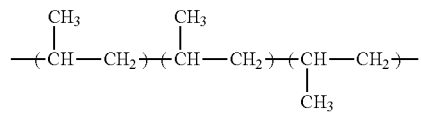

PPP(rr):

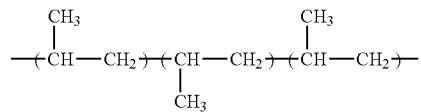

The calculation of the mm Fraction of a propylene polymer is described in U.S. Pat. No. 5,504,172 (homopolymer: column 25, line 49 to column 27, line 26; copolymer: column 28, line 38 to column 29, line 67). For further information on how the mm triad tacticity can be determined from a $^{13}$C NMR spectrum, see 1) J. A. Ewen, CATALYTIC POLYMERIZATION OF OLEFINS: PROCEEDINGS OF THE INTERNATIONAL SYMPOSIUM ON FUTURE ASPECTS OF OLEFIN POLYMERIZATION, T. Keii and K. Soga, Eds. (Elsevier, 1986), pp. 271-292; and 2) U.S. Patent Application Publication No. 2004/054086 (paragraphs [0043] to [0054]).

Ethylene content in ethylene copolymers is determined by ASTM D 5017-96, except that the minimum signal-to-noise should be 10,000:1. Propylene content in propylene copolymers is determined by following the approach of Method 1 in Di Martino and Kelchermans, *J. Appl. Polym. Sci.* 56, p. 1781 (1995), and using peak assignments from Zhang, *Polymer* 45, p. 2651 (2004) for higher olefin comonomers.

Procedures for measuring the total pore volume of a porous support are well known in the art. Details of one of these procedures is discussed in Volume 1, *Experimental Methods in Catalytic Research* (Academic Press, 1968) (specifically see pages 67-96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332-334 (March, 1956). Another well-known method is described in ASTM D4284. For purposes of this invention and the claims thereto, in the event of conflict between the three, Volume 1, *Experimental Methods in Catalytic Research* (Academic Press, 1968) (specifically see pages 67-96) shall be used. The weight average particle size is measured by determining the weight of material collected on a series of U.S. Standard sieves and determining the weight average particle size in micrometers based on the sieve series used.

In another embodiment the impact copolymers discussed and described herein can relate to:

1. A process for making an impact copolymer, comprising: polymerizing ethylene and at least one comonomer in the presence of one or more catalysts, polypropylene particles, and an inert solvent to produce an impact copolymer comprising the polypropylene particles and an ethylene copolymer, wherein the polypropylene particles have a weight average particle size along the longest cross-sectional length thereof of about 0.05 mm to about 5 mm and a pore volume of less than 80%, wherein the inert solvent is present in a volume amount of about 0.1 to about 2 times the pore volume of the polypropylene particles.
2. The process according to paragraph 1, wherein a miscibility of propylene in the inert solvent is greater than a miscibility of ethylene in the inert solvent.
3. The process according to paragraph 1 or 2, wherein the inert solvent comprises hexane, cyclohexane, toluene, or any mixture thereof.
4. The process according to any one of paragraphs 1 to 3, further comprising polymerizing a non-conjugated diene with the ethylene and the at least one comonomer to produce the impact copolymer.
5. The process according to any one of paragraphs 1 to 4, wherein the ethylene copolymer has an ethylene content of from about 20 wt % to about 85 wt %, and wherein an amount of the ethylene copolymer in the impact copolymer is from about 5 wt % to about 85 wt %, based on the combined weight of the polypropylene particles and the ethylene copolymer.
6. The process according to any one of paragraphs 1 to 5, wherein the impact copolymer comprises at least 15 wt % to about 45 wt % of the ethylene copolymer, based on the combined weight of the polypropylene particles and the ethylene copolymer.
7. The process according to any one of paragraphs 1 to 6, wherein the impact copolymer comprises at least 20 wt % to about 40 wt % of the ethylene copolymer, based on the total weight of the impact copolymer.
8. The process according to any one of paragraphs 1 to 7, wherein the ethylene copolymer has a weight average molecular weight of about 50 kg/mol to about 3,000 kg/mol.
9. The process according to any one of paragraphs 1 to 8, wherein the inert solvent is present in a volume amount of about 0.5 to about 1.5 times the pore volume of the polypropylene particles.
10. The process according to paragraph 1, wherein the impact copolymer has an ethylene copolymer content of at least about 13 wt % to about 35 wt %, based on the combined weight of the polypropylene particles and the ethylene copolymer, a notched Izod impact strength at 23° C. of at least 25 KJ/m$^2$ to about 110 KJ/m$^2$, and a flexural modulus less than 2,100 MPa to about 1,400 MPa.
11. The process according to paragraph 1, wherein the ethylene copolymer has a weight average molecular weight of at least 30 kg/mol to about 200 kg/mol, and wherein the impact copolymer has a notched Izod impact strength at 23° C. of at least 25 KJ/m$^2$ to about 110 KJ/m$^2$, and a melt flow ratio (MFR) less than 20 dg/min to about 100 dg/min.
12. The process according to any one of paragraphs 1 to 11, wherein the ethylene and the comonomer are polymerized within a gas-phase reactor.
13. The process according to any one of paragraphs 1 to 12, wherein the catalyst comprises a metallocene catalyst.
14. The process according to any one of paragraphs 1 to 13, wherein the catalyst comprises a Ziegler-Natta catalyst.
15. The process according to any one of paragraphs 1 to 13, wherein the catalyst comprises a Ziegler-Natta catalyst, wherein the Ziegler-Natta catalyst comprises a solid catalyst component, a co-catalyst, and an external electron donor, and wherein the solid catalyst component comprises a titanium compound, a magnesium compound, and an internal electron donor.
16. The process according to any one of paragraphs 1 to 15, wherein the inert solvent has a boiling point at atmospheric pressure of about 55° C. to about 135° C.
17. The process according to any one of paragraphs 1 to 16, wherein the polypropylene particles have a pore volume from about 5% to about 80%.
18. A process for making an impact copolymer, comprising: mixing polypropylene particles having a weight average particle size along the longest cross-sectional length thereof of from about 0.05 mm to about 5 mm and a pore volume of less than 80% with one or more inert solvents to provide inert solvent containing polypropylene particles, wherein at least a portion of the one or more inert solvents is located within the pore volume of the polypropylene particles; and polymerizing ethylene and at least one comonomer in the presence of a catalyst and the inert solvent containing polypropylene particles to produce an impact copolymer.
19. A process for making an impact copolymer, comprising: i) combining ethylene and at least one comonomer with a Ziegler-Natta catalyst or a single site catalyst in a polymerization reactor at conditions sufficient to produce polypropylene particles having a weight average particle size along the longest cross-sectional length thereof of about 0.05 mm to about 5 and a pore volume of less than 80%; ii) combining the polypropylene particles with an inert solvent to produce inert solvent-containing polypropylene particles having at least a portion of the inert solvent located within the pores of the polypropylene particles; iii) combining ethylene and at least one comonomer with the with the inert solvent-containing polypropylene particles and the catalyst, wherein at least a portion of the ethylene and at least a portion of the comonomer are located within the pores of the polypropylene particles; and iv) polymerizing the ethylene and the comonomer within the pores of the polypropylene particles to produce an impact copolymer.

20. The process according to paragraph 19, wherein a concentration of the comonomer within the pores of the polypropylene particles is greater than a concentration of the ethylene.

21. The process of paragraph 19 or 20, wherein the catalyst used in step i) is the same as the catalyst in step iii).

22. The process of paragraph 19 or 20, wherein the catalyst used in step i) is different than the catalyst in step iii). "Different" as used to refer to catalysts indicates that the compounds differ from each other by at least one atom or are different isomerically.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, priority documents, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for making an impact copolymer, comprising:
polymerizing, in a gas-phase reactor, ethylene and at least one comonomer in the presence of one or more catalysts, polypropylene particles, and an inert solvent to produce an impact copolymer comprising the polypropylene particles and an ethylene copolymer, wherein: 1) the polypropylene particles introduced into the gas phase reactor have a weight average particle size along the longest cross-sectional length thereof of about 0.05 mm to about 5 mm and a pore volume of less than 80%, 2) the inert solvent is present in a volume amount of about 0.1 to about 2 times the pore volume of the polypropylene particles, and 3) the inert solvent comprises pentane, hexane, heptane, octane, nonane, decane, isomers thereof, and/or any mixture thereof; cyclopentane, cyclohexane, cycloheptane, cyclooctane, cyclononane, cyclodecane, or any mixture thereof; toluene, naphthalene, xylene and biphenyl, or any mixture thereof; cyclohexane, cyclopentane, methyl cyclohexane, or any mixture thereof; tetramethyl silane, tetraethyl silane, triethyl borane, or any mixture thereof; or hexane, cyclohexane, toluene, or any mixture thereof.

2. The process of claim 1, wherein the comonomer is propylene and the miscibility of propylene in the inert solvent is greater than the miscibility of ethylene in the inert solvent.

3. The process of claim 1, wherein the inert solvent comprises hexane, cyclohexane, toluene, or any mixture thereof.

4. The process of claim 1, further comprising polymerizing a non-conjugated diene with the ethylene and the at least one comonomer to produce the impact copolymer.

5. The process of claim 1, wherein the ethylene copolymer has an ethylene content of from about 20 wt % to about 85 wt %, and wherein an amount of the ethylene copolymer in the impact copolymer is from about 5 wt % to about 85 wt %, based on the combined weight of the polypropylene particles and the ethylene copolymer.

6. The process of claim 1, wherein the impact copolymer comprises at least 15 wt % to about 45 wt % of the ethylene copolymer, based on the combined weight of the polypropylene particles and the ethylene copolymer.

7. The process of claim 1, wherein the impact copolymer comprises at least 20 wt % to about 40 wt % of the ethylene copolymer, based on the total weight of the impact copolymer.

8. The process of claim 1, wherein the ethylene copolymer has a weight average molecular weight of about 50 kg/mol to about 3,000 kg/mol.

9. The process of claim 1, wherein the inert solvent is present in a volume amount of about 0.5 to about 1.5 times the pore volume of the polypropylene particles.

10. The process of claim 1, wherein the impact copolymer has an ethylene copolymer content of at least about 13 wt % to about 35 wt %, based on the combined weight of the polypropylene particles and the ethylene copolymer, a notched Izod impact strength at 23° C. of at least 25 KJ/m$^2$ to about 110 KJ/m$^2$, and a flexural modulus less than 2,100 MPa to about 1,400 MPa.

11. The process of claim 1, wherein the ethylene copolymer has a weight average molecular weight of at least 30 kg/mol to about 200 kg/mol, and wherein the impact copolymer has a notched Izod impact strength at 23° C. of at least 25 KJ/m$^2$ to about 110 KJ/m$^2$, and a melt flow ratio (MFR) less than 20 dg/min to about 100 dg/min.

12. The process of claim 1, wherein the catalyst comprises a metallocene catalyst.

13. The process of claim 1, wherein the catalyst comprises a Ziegler-Natta catalyst.

14. The process of claim 13, wherein the Ziegler-Natta catalyst comprises a solid catalyst component, a co-catalyst, and an external electron donor, and wherein the solid catalyst component comprises a titanium compound, a magnesium compound, and an internal electron donor.

15. The process of claim 1, wherein the inert solvent has a boiling point at atmospheric pressure of about 55° C. to about 135° C.

16. The process of claim 1, wherein the polypropylene particles have a pore volume from about 5% to about 80%.

17. A process for making an impact copolymer, comprising:
mixing polypropylene particles having a weight average particle size along the longest cross-sectional length thereof of from about 0.05 mm to about 5 mm and a pore volume of less than 80% with one or more inert solvents in the absence of fluorocarbon to provide inert solvent containing polypropylene particles, wherein at least a portion of the one or more inert solvents is located within the pore volume of the polypropylene particles; and polymerizing, in the gas phase, ethylene and at least one comonomer in the presence of a catalyst and the inert solvent containing polypropylene particles to produce an impact copolymer.

18. A process for making an impact copolymer, comprising:
i) combining propylene and optional comonomer with a Ziegler-Natta catalyst or a single site catalyst in a polymerization reactor at conditions sufficient to produce polypropylene particles having a weight average particle size along the longest cross-sectional length thereof of about 0.05 mm to about 5 mm and a pore volume of less than 80%;
ii) combining the polypropylene particles with an inert solvent to produce inert solvent containing polypropylene particles having at least a portion of the inert solvent located within the pores of the polypropylene particles;
iii) combining ethylene and at least one comonomer with the inert solvent-containing polypropylene particles and the catalyst, wherein at least a portion of the ethylene and at least a portion of the comonomer are located within the pores of the polypropylene particles; and
iv) polymerizing, in the gas phase, the ethylene and the comonomer within the pores of the polypropylene particles to produce an impact copolymer.

19. The process of claim 18, wherein in step iii), a concentration of the comonomer within the pores of the polypropylene is greater than a concentration of the ethylene.

20. The process of claim 18, wherein the catalyst used in step i) is the same as the catalyst in step iii).

21. The process of claim 18, wherein the catalyst used in step i) is different than the catalyst used in step iii).

22. The process of claim 18, wherein the catalyst used in step i) is different by at least one atom from the catalyst used in step iii).

23. The process of claim 19, wherein the catalyst used in step i) is the same as the catalyst in step iii).

24. The process of claim 19, wherein the catalyst used in step i) is different than the catalyst used in step iii).

25. The process of claim 19, wherein the catalyst used in step i) is different by at least one atom from the catalyst used in step iii).

26. The process of claim 1, wherein:
a) at least a portion of the inert solvent is located within the pore volume of the polypropylene particles introduced into the gas phase reactor, and
b) at least a portion of the inert solvent located within the pores of the polypropylene particles is in the liquid phase.

27. The process of claim 1, wherein the inert solvent is mixed, blended, or otherwise contacted with the polypropylene particles and the catalyst disposed therein, thereon, or otherwise about the polypropylene particles at any desired point during the production of the impact copolymer.

28. The process of claim 1, wherein the inert solvent is contacted with the polypropylene particles and the solvent-containing polypropylene particles are introduced to the gas phase polymerization reactor.

29. The process of claim 1, wherein the inert solvent is contacted with the polypropylene particles within the reactor.

30. The process of claim 1, wherein the inert solvent is mixed, blended, or otherwise contacted with the ethylene and/or the comonomer and introduced as a mixture to the gas phase reactor.

31. The process of claim 1, wherein the polypropylene particles are produced in the presence of the inert solvent, thus forming solvent-containing polypropylene particle via the polymerization of the polypropylene and, if present, any comonomers.

32. The process of claim 1, wherein the inert solvent is mixed, blended, or otherwise contacted with the ethylene and introduced as a mixture to the gas phase reactor.

33. The process of claim 17, wherein the inert solvent comprises pentane, hexane, heptane, octane, nonane, decane, isomers thereof, and/or any mixture thereof; cyclopentane, cyclohexane, cycloheptane, cyclooctane, cyclononane, cyclodecane, or any mixture thereof; toluene, naphthalene, xylene, and biphenyl, or any mixture thereof; cyclohexane, cyclopentane, methyl cyclohexane, or any mixture thereof; tetramethyl silane, tetraethyl silane, triethyl borane, or any mixture thereof; or hexane, cyclohexane, toluene, or any mixture thereof.

34. The process of claim 18, wherein the inert solvent comprises pentane, hexane, heptane, octane, nonane, decane, isomers thereof, and/or any mixture thereof; cyclopentane, cyclohexane, cycloheptane, cyclooctane, cyclononane, cyclodecane, or any mixture thereof; toluene, naphthalene, xylene and biphenyl, or any mixture thereof; cyclohexane, cyclopentane, methyl cyclohexane, or any mixture thereof; tetramethyl silane, tetraethyl silane, triethyl borane, or any mixture thereof; or hexane, cyclohexane, toluene, or any mixture thereof.

35. The process of claim 1, wherein the inert solvent is present in a volume amount of 0.5 to 1.4 times the pore volume of the polypropylene particles.

36. A process for making an impact copolymer, comprising:
polymerizing in the absence of a fluorocarbon, in a gas-phase reactor, ethylene and at least one comonomer in the presence of one or more catalysts, polypropylene particles, and an inert solvent to produce an impact copolymer comprising the polypropylene particles and an ethylene copolymer, wherein: 1) the polypropylene particles introduced into the gas phase reactor have a weight average particle size along the longest cross-sectional length thereof of about 0.05 mm to about 5 mm and a pore volume of less than 80%; and 2) the inert solvent is present in a volume amount of about 0.1 to about 2 times the pore volume of the polypropylene particles.

* * * * *